(12) United States Patent
Koo et al.

(10) Patent No.: US 11,405,614 B2
(45) Date of Patent: Aug. 2, 2022

(54) METHOD AND APPARATUS FOR PROCESSING VIDEO SIGNAL BY APPLYING SECONDARY TRANSFORM TO PARTITIONED BLOCK

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/031,089

(22) Filed: Sep. 24, 2020

(65) Prior Publication Data
US 2021/0014493 A1  Jan. 14, 2021

Related U.S. Application Data

(63) Continuation of application No. PCT/KR2019/003811, filed on Apr. 1, 2019.
(Continued)

(51) Int. Cl.
*H04N 19/122* (2014.01)
*H04N 19/167* (2014.01)
(Continued)

(52) U.S. Cl.
CPC ......... *H04N 19/122* (2014.11); *H04N 19/167* (2014.11); *H04N 19/176* (2014.11); *H04N 19/18* (2014.11); *H04N 19/91* (2014.11)

(58) Field of Classification Search
CPC .... H04N 19/122; H04N 19/625; H04N 19/60; H04N 1/32181; H04N 19/61; H04N 19/176; H04N 19/12
See application file for complete search history.

(56) References Cited

U.S. PATENT DOCUMENTS 9,432,696 B2 * 8/2016 Chong ................. H04N 19/176
9,516,345 B2 * 12/2016 Chong ................. H04N 19/60
(Continued)

FOREIGN PATENT DOCUMENTS

CA   3019490    11/2017
EP   3567858    11/2019
(Continued)

OTHER PUBLICATIONS

Koo et al.; "Description of SDR video coding technology proposal by LG Electronics;" Joint Video Experts Team (JVET) of ITU-T SG 16 WP 3 and ISO/IEC JTC 1/SC 29/WG 11; 10th Meeting: San Diego, US, Apr. 10-20, 2018; JVET-J0017 (Year: 2018).*
(Continued)

*Primary Examiner* — Daniel Chang
(74) *Attorney, Agent, or Firm* — Fish & Richardson P.C.

(57) ABSTRACT

Systems and techniques for reconstructing a video signal include: obtaining a transform coefficient block by performing an entropy decoding and a dequantization for a current block; deriving a secondary transform corresponding to a specific area in the transform coefficient block, wherein the specific area represents an area including a top-left block of the transform coefficient block; performing an inverse secondary transform for each of subblocks within the specific area using the secondary transform; performing an inverse primary transform for a block which the inverse secondary transform is applied to; and reconstructing the current block using a block which the primary inverse transform is applied to.

13 Claims, 28 Drawing Sheets

Related U.S. Application Data

(60) Provisional application No. 62/651,236, filed on Apr. 1, 2018.

(51) Int. Cl.
*H04N 19/176* (2014.01)
*H04N 19/18* (2014.01)
*H04N 19/91* (2014.01)

(56) References Cited

U.S. PATENT DOCUMENTS

| | | | | |
|---|---|---|---|---|
| 9,661,338 | B2* | 5/2017 | Karczewicz | H04N 19/176 |
| 2006/0294172 | A1* | 12/2006 | Zhong | G06F 17/147 |
| | | | | 708/400 |
| 2012/0057630 | A1* | 3/2012 | Saxena | H04N 19/105 |
| | | | | 375/240.03 |
| 2013/0195177 | A1* | 8/2013 | Hong | G06F 17/147 |
| | | | | 375/240.18 |
| 2017/0034530 | A1 | 2/2017 | Cherepanov et al. | |
| 2017/0094313 | A1 | 3/2017 | Zhao et al. | |
| 2017/0280162 | A1* | 9/2017 | Zhao | H04N 19/176 |
| 2017/0324643 | A1* | 11/2017 | Seregin | H04N 19/16 |
| 2018/0020218 | A1* | 1/2018 | Zhao | H04N 19/61 |
| 2018/0077417 | A1* | 3/2018 | Huang | H04N 19/70 |
| 2018/0288439 | A1* | 10/2018 | Hsu | H04N 19/91 |
| 2018/0302631 | A1* | 10/2018 | Chiang | H04N 19/124 |
| 2019/0149822 | A1* | 5/2019 | Kim | H04N 19/70 |
| | | | | 375/240.02 |
| 2019/0246102 | A1* | 8/2019 | Cho | H04N 19/109 |
| 2019/0273921 | A1* | 9/2019 | Abe | H04N 19/176 |
| 2019/0281321 | A1* | 9/2019 | Zhao | H04N 19/625 |
| 2019/0349587 | A1* | 11/2019 | Jang | H04N 19/176 |
| 2019/0387227 | A1* | 12/2019 | Urban | H04N 19/12 |
| 2020/0213626 | A1* | 7/2020 | Ikai | H04N 19/96 |
| 2020/0322623 | A1* | 10/2020 | Chiang | H04N 19/46 |

FOREIGN PATENT DOCUMENTS

| | | |
|---|---|---|
| JP | 2013542664 | 11/2013 |
| KR | 1020170117112 | 10/2017 |
| KR | 1020180014655 | 2/2018 |
| WO | WO2017195666 | 11/2017 |
| WO | WO2017195667 | 11/2017 |
| WO | WO-2018166429 A1 * | 9/2018 ........... H04N 19/159 |

OTHER PUBLICATIONS

Said et al.; Non-Separable Secondary Transform Implementations with Reduced Memory via Hierarchically Structured Matrix-based Transforms; Joint Video Experts Team (JVET) of ITU-T SG 16 WP 3 and ISO/IEC JTC 1/SC 29/WG 11; 10th Meeting: San Diego, US, Apr. 10-20, 2018; JVET-J0062 (Year: 2018).*

Koo et al.; "CE 6.2.6: Reduced Secondary Transform (RST);" Joint Video Experts Team (JVET) of ITU-T SG 16 WP 3 and ISO/IEC JTC 1/SC 29/WG 11; 11th Meeting: Ljubljana, SI, Jul. 10-18, 2018; JVET-K0099 (Year: 2018).*

PCT International Search Report in International Application No. PCT/KR2019/003811, dated Jul. 22, 2019, 7 pages (with English translation).

VCED-AZ05, "ITU—Telecommunications Standardization Sector" Study Group 16 Questions 6, Video Coding Experts Group (VCEG), Jun. 19-26, 2015, Warsaw, Poland, 5 pages.

Chen et al., "Algorithm description of joint exploration test model 1," JVET-A1001, Joint Video Exploration Team (JVET) of ITU-T SG 16 WP 3 and 1S0/IEC JTC 1/SC 29/WG 11, 1st Meeting: Geneva, CH, 19-21, dated Oct. 2015, 27 pages.

EP Extended European Search Report in European Appln. No. 19780795.1, dated Mar. 1, 2021, 10 pages.

JVET, "Algorithm Description of Joint Exploration Test Model 4 (JEM4)," ISO/IEC JTC1/SC29/WG11/N16511, Chengdu, CN, dated Oct. 2016, 39 pages.

Zhao et al., "TU-level non-separable secondary transform," JVET-80059, ISO/IEC JTC1/SC29/WG11 and ITU-T SG 16, dated Feb. 2016, 6 pages, XP030247106.

Office Action in Japanese Appln. No. 2021-502680, dated Oct. 5, 2021, 7 pages (with English translation).

* cited by examiner

FIG. 6

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
|  | 1 | DCT5 | DST7 |  |  |
|  | 2 | DST7 | DCT5 |  |  |
|  | 3 | DCT5 | DCT5 |  |  |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
|  | 1 | DST1 | DST7 |  |  |
|  | 2 | DST7 | DST1 |  |  |
|  | 3 | DST1 | DST1 |  |  |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
|  | 1 | DCT8 | DST7 |  |  |
|  | 2 | DST7 | DCT8 |  |  |
|  | 3 | DCT8 | DCT8 |  |  |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
|  | 1 | DCT5 | DST7 |  |  |
|  | 2 | DST7 | DCT8 |  |  |
|  | 3 | DCT5 | DCT8 |  |  |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
|  | 1 | DCT8 | DST7 |  |  |
|  | 2 | DST7 | DCT5 |  |  |
|  | 3 | DCT8 | DCT5 |  |  |
| Group 5 (G5) | 0 | DCT8 | DCT8 | Inter prediction | Inter prediction |
|  | 1 | DST7 | DCT8 |  |  |
|  | 2 | DCT8 | DST7 |  |  |
|  | 3 | DST7 | DST7 |  |  |

FIG. 12

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

FIG. 18
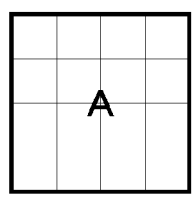
(a)
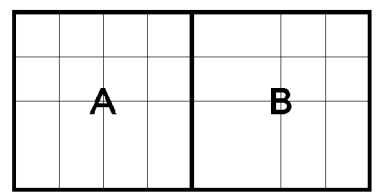
(b)
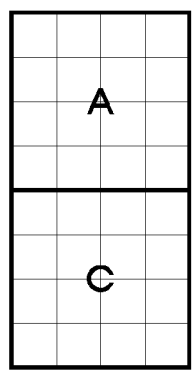
(c)
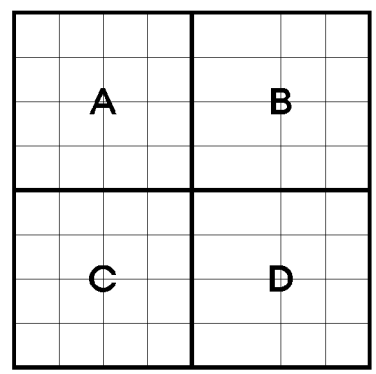
(d)

FIG. 19

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 20A

| 0 | 0 | 0 | 0 | 0 | 0 | 0 | 1 |
|---|---|---|---|---|---|---|---|
| 0 | 0 | 0 | 0 | 0 | 0 | 1 | 1 |
| 0 | 0 | 0 | 0 | 0 | 0 | 1 | 1 |
| 0 | 0 | 0 | 0 | 0 | 1 | 1 | 1 |
| 0 | 0 | 0 | 0 | 1 | 1 | 1 | 1 |
| 0 | 0 | 0 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |

FIG. 20B

| 0 | 0 | 0 | 0 | 0 | 0 | 0 | 2 |
|---|---|---|---|---|---|---|---|
| 0 | 0 | 0 | 0 | 0 | 0 | 2 | 2 |
| 0 | 0 | 0 | 0 | 0 | 0 | 2 | 2 |
| 0 | 0 | 0 | 0 | 0 | 2 | 2 | 2 |
| 0 | 0 | 0 | 0 | 1 | 2 | 2 | 2 |
| 0 | 0 | 0 | 1 | 1 | 1 | 2 | 2 |
| 0 | 1 | 1 | 1 | 1 | 1 | 2 | 2 |
| 1 | 1 | 1 | 1 | 1 | 1 | 1 | 2 |

FIG. 23

| 1  | 3  | 6  | 10 | 15 | 21 | 28 | 36 |
|----|----|----|----|----|----|----|----|
| 2  | 5  | 9  | 14 | 20 | 27 | 35 | 43 |
| 4  | 8  | 13 | 19 | 26 | 34 | 42 | 49 |
| 7  | 13 | 18 | 25 | 33 | 41 | 48 | 54 |
| 11 | 17 | 24 | 32 | 40 | 47 | 53 | 58 |
| 16 | 23 | 31 | 39 | 46 | 52 | 57 | 61 |
| 22 | 30 | 38 | 45 | 51 | 56 | 60 | 63 |
| 29 | 37 | 44 | 50 | 55 | 59 | 62 | 64 |

FIG. 24

| Group No. | SUM OF X COORDINATE AND Y COORDINATE | DATA SET |
|---|---|---|
| 1 | 0 | 1 |
| 2 | 1 | 2, 3 |
| 3 | 2 | 4, 5, 6 |
| 4 | 3 | 7, 8, 9, 10 |
| 5 | 4 | 11, 12, 13, 14, 15 |
| 6 | 5 | 16, 17, 18, 19, 20, 21 |
| 7 | 6 | 22, 23, 24, 25, 26, 27, 28 |
| 8 | 7 | 29, 30, 31, 32, 33, 34, 35, 36 |
| 9 | 8 | 37, 38, 39, 40, 41, 42, 43 |
| 10 | 9 | 44, 45, 46, 47, 48, 49 |
| 11 | 10 | 50, 51, 52, 53, 54 |
| 12 | 11 | 55, 56, 57, 58 |
| 13 | 12 | 59, 60, 61 |
| 14 | 13 | 62, 63 |
| 15 | 14 | 64 |

FIG. 25

| 1  | 2  | 4  | 7  | 11 | 16 | 22 | 29 |
|----|----|----|----|----|----|----|----|
| 3  | 5  | 8  | 12 | 17 | 23 | 30 | 37 |
| 6  | 9  | 13 | 18 | 24 | 31 | 38 | 44 |
| 10 | 14 | 19 | 25 | 32 | 39 | 45 | 50 |
| 15 | 20 | 26 | 33 | 40 | 46 | 51 | 55 |
| 21 | 27 | 34 | 41 | 47 | 52 | 56 | 59 |
| 28 | 35 | 42 | 48 | 53 | 57 | 60 | 62 |
| 36 | 43 | 49 | 54 | 58 | 61 | 63 | 64 |

FIG. 26

| 1  | 3  | 6  | 10 | 33 | 35 | 38 | 42 |
|----|----|----|----|----|----|----|----|
| 2  | 5  | 9  | 13 | 34 | 37 | 41 | 45 |
| 4  | 8  | 12 | 15 | 36 | 40 | 44 | 47 |
| 7  | 11 | 14 | 16 | 39 | 43 | 46 | 48 |
| 17 | 19 | 22 | 26 | 49 | 51 | 54 | 58 |
| 18 | 21 | 25 | 29 | 50 | 53 | 57 | 61 |
| 20 | 24 | 28 | 31 | 52 | 56 | 60 | 63 |
| 23 | 27 | 30 | 32 | 55 | 59 | 62 | 64 |

METHOD AND APPARATUS FOR PROCESSING VIDEO SIGNAL BY APPLYING SECONDARY TRANSFORM TO PARTITIONED BLOCK

CROSS REFERENCE TO RELATED APPLICATIONS

This application is a continuation of International Application No. PCT/KR2019/003811, filed on Apr. 1, 2019, which claims the benefit of U.S. Provisional Application No. 62/651,236 filed on Apr. 1, 2018, the contents of which are all hereby incorporated by reference herein in their entirety.

TECHNICAL FIELD

The present disclosure relates to a method and an apparatus for processing a video signal, and more particularly, to a method for partitioning a specific area of a transform coefficient block into 4×4 blocks and then applying an individual secondary transform for each partitioned block and a method for allocating and sharing a secondary transform to the partitioned blocks.

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

SUMMARY

An embodiment of the present disclosure provides an encoder/decoder structure for reflecting a new transform design.

Furthermore, an embodiment of the present disclosure provides a method and a structure for dividing a specific area of a transform coefficient block into 4×4 blocks and then applying an individual secondary transform for each divided block and a method for allocating and sharing a secondary transform to the divided blocks.

The present disclosure provides a method for reducing complexity and enhancing coding efficiency through a new transform design.

The present disclosure provides a method for dividing a specific area of a transform coefficient block into 4×4 blocks and then individually applying a secondary transform for each divided block or sharing the secondary transform between some divided blocks.

The present disclosure provides a method for sharing a second transform for a 4×4 block which exists at the same location between blocks having various sizes and shapes.

The present disclosure provides a method for conditionally applying a secondary transform by comparing the number of non-zero transform coefficients and a threshold for each of 4×4 divided blocks.

The present disclosure provides a method for individually applying a secondary transform for all 4×4 divided blocks.

The present disclosure provides a method for configuring, when an area to which a secondary transform is applied is divided into an arbitrary size or shape, a secondary transform for the divided areas.

The present invention has an advantage in that when a still image or moving picture is encoded, an area to which a secondary transform is applied is divided into smaller areas and then secondary transforms are applied to the small areas to reduce complexity required for performing the secondary transform.

Furthermore, the present invention has an advantage in that the secondary transform can be shared between divided blocks or a more appropriate secondary transform can be selected to adjust trade-off of coding performance and complexity.

As described above, the present invention has an advantage in that a computational complexity can be reduced and coding efficiency can be enhanced through a new transform design.

DESCRIPTION OF DRAWINGS

FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

FIG. 6 is a table showing a transform configuration group to which Multiple Transform Selection (MTS) is applied as an embodiment to which the present disclosure is applied.

FIG. 12 is a table showing allocation of a transform set for each intra prediction mode in an NSST as an embodiment to which the present disclosure is applied.

FIG. 18 illustrates partitions for a maximum of 8×8 top-left divided areas to which a 4×4 secondary transform is applied as an embodiment to which the present disclosure is applied.

FIG. 19 is a diagram for describing a method for dividing an area to which a secondary transform is applied into M areas and allocating an index to each location as an embodiment to which the present disclosure is applied.

FIGS. 20A and 20B are diagrams for describing a method for dividing, when dividing an area to which a secondary transform is applied, a transform to the divided area as an embodiment to which the present disclosure is applied.

FIGS. 23 to 25 are embodiments to which the present disclosure is applied, and FIGS. 23 and 25 illustrate other examples of dividing an area to which a secondary transform is applied into M areas and allocating an index to each location and FIG. 24 is a diagram for describing a method for classifying areas based on grouping.

FIG. 26 is a diagram for describing a method for dividing an area to which a secondary transform is applied into M areas based on a scan order as an embodiment to which the present disclosure is applied.

BEST MODE

Figure 1:
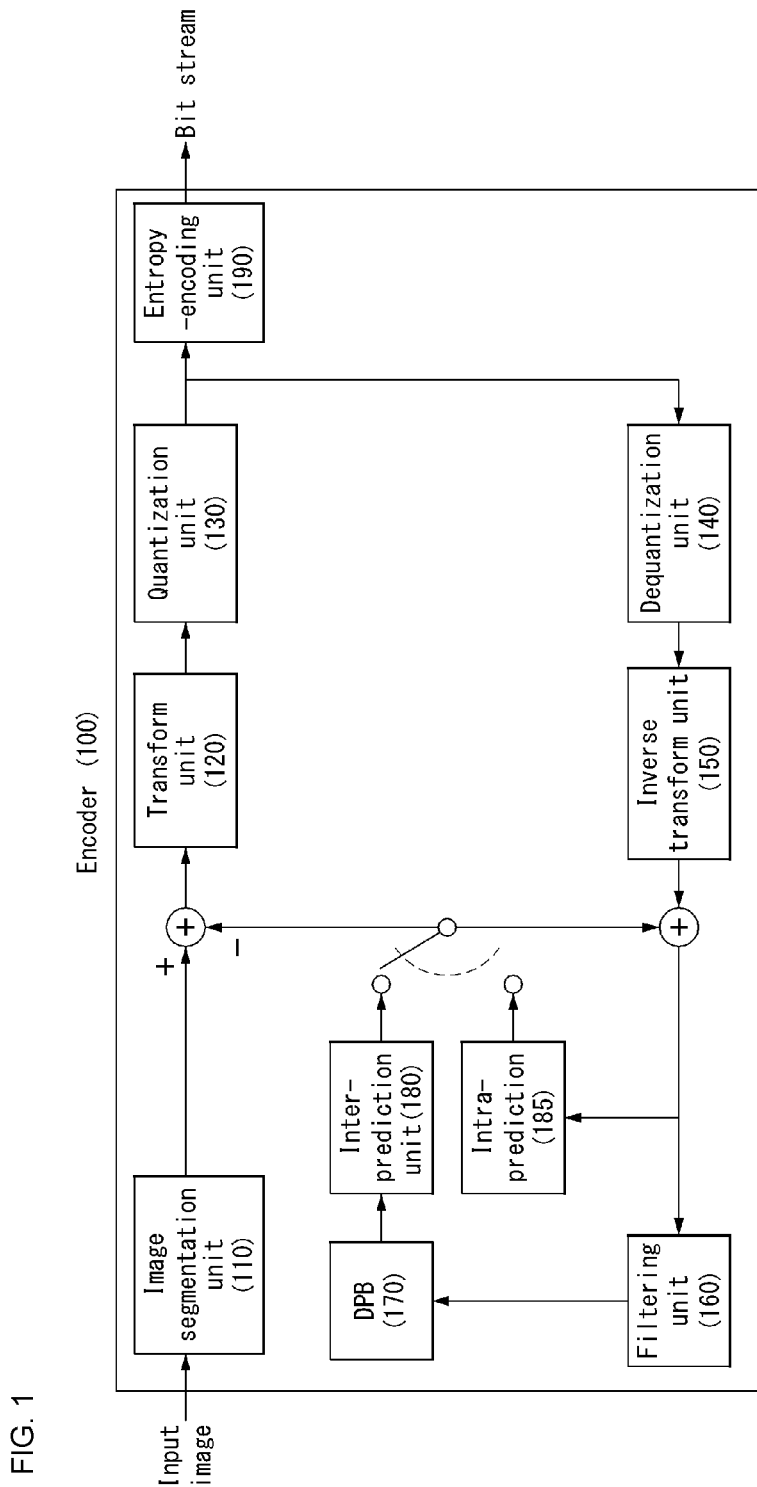
FIG. 1 is a block diagram illustrating the configuration of an encoder for encoding a video signal according to an embodiment of the present disclosure.

The present disclosure provides a method for reconstructing a video signal, which includes: obtaining a transform coefficient block by performing an entropy decoding and a dequantization for a current block; deriving a secondary transform corresponding to a specific area in the transform coefficient block, wherein the specific area represents an area including a top-left block of the transform coefficient block; performing an inverse secondary transform for each of subblocks within the specific area using the secondary transform; performing an inverse primary transform for a block which the inverse secondary transform is applied to; and reconstructing the current block using a block which the primary inverse transform is applied to.

In the present disclosure, the specific area is divided into 4×4 subblocks and the inverse secondary transform is performed for each of the 4×4 subblocks.

In the present disclosure, the same 4×4 secondary transform is applied or different 4×4 secondary transforms are applied to the 4×4 subblocks based on at least one of locations or prediction modes of the subblocks.

In the present disclosure, whether the specific area is split into 4×4 subblocks is determined based on a size of the transform coefficient block.

In the present disclosure, the method further includes checking whether the number of non-zero transform coefficients within in the 4×4 subblocks is equal to or more than a specific threshold, in which whether the 4×4 secondary transform is applied to the 4×4 subblocks is determined according to the checking result.

In the present disclosure, when the number of non-zero transform coefficients within the 4×4 subblock is equal to or more than the specific threshold, the 4×4 secondary transform is applied to the 4×4 subblock and otherwise, the 4×4 secondary transform is not be applied to the 4×4 subblock.

The present disclosure provides an apparatus for reconstructing a video signal, which includes: an entropy decoding unit performing an entropy decoding for a current block; a dequantization unit performing a dequantization for the current block in which the entropy decoding is performed to obtain a transform coefficient block; a transform unit deriving a secondary transform corresponding to a specific area within the transform coefficient block, performing an inverse secondary transform for each of subblocks within the specific area by using the secondary transform, and performing an inverse primary transform for a block which the inverse secondary transform is applied; and a reconstruction unit reconstructing the current block using a block which the inverse primary transform is applied to, in which the specific area represents an area including a top-left block of the transform coefficient block.

DETAILED DESCRIPTION

Hereinafter, a configuration and operation of an embodiment of the present disclosure will be described in detail with reference to the accompanying drawings, a configuration and operation of the present disclosure described with reference to the drawings are described as an embodiment, and the scope, a core configuration, and operation of the present disclosure are not limited thereto.

Further, terms used in the present disclosure are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present disclosure and a meaning of the corresponding term should be comprehended and construed.

Further, when there is a general term selected for describing the invention or another term having a similar meaning, terms used in the present disclosure may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure, Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present disclosure is not limited to the expressions.

FIG. 1 is a schematic block diagram of an encoder in which encoding of a video signal is performed as an embodiment to which the present disclosure is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU).

However, the terms are only used for the convenience of description of the present disclosure and the present disclosure is not limited to the definition of the terms. In addition, in the present disclosure, for the convenience of the description, the term coding unit is used as a unit used in encoding or decoding a video signal, but the present disclosure is not limited thereto and may be appropriately interpreted according to the present disclosure.

The encoder 100 subtracts a prediction signal (or a prediction block) output from the inter-prediction unit 180 or the intra-prediction unit 185 from the input image signal to generate a residual signal (or a residual block) and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include the transforms (or transform combinations) described in FIG. 6 of the present disclosure. In the present disclosure, the transform or transform type may be expressed as, for example, DCT-Type 2, DCT-II, DCT2, or DCT-2.

The transform unit 120 may perform the following embodiments.

The present disclosure provides a method and a structure for dividing a specific area of a transform coefficient block into 4×4 blocks and then applying an individual secondary transform for each divided block and a method for allocating and sharing a secondary transform to the divided blocks.

Detailed embodiments thereof will be described in more detail in the present disclosure.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the transform unit 120 and the quantization unit 130 are described as separate functional units, the present disclosure is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. Here, since the reference picture used for prediction is a transformed signal that is quantized and dequantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

Figure 2:
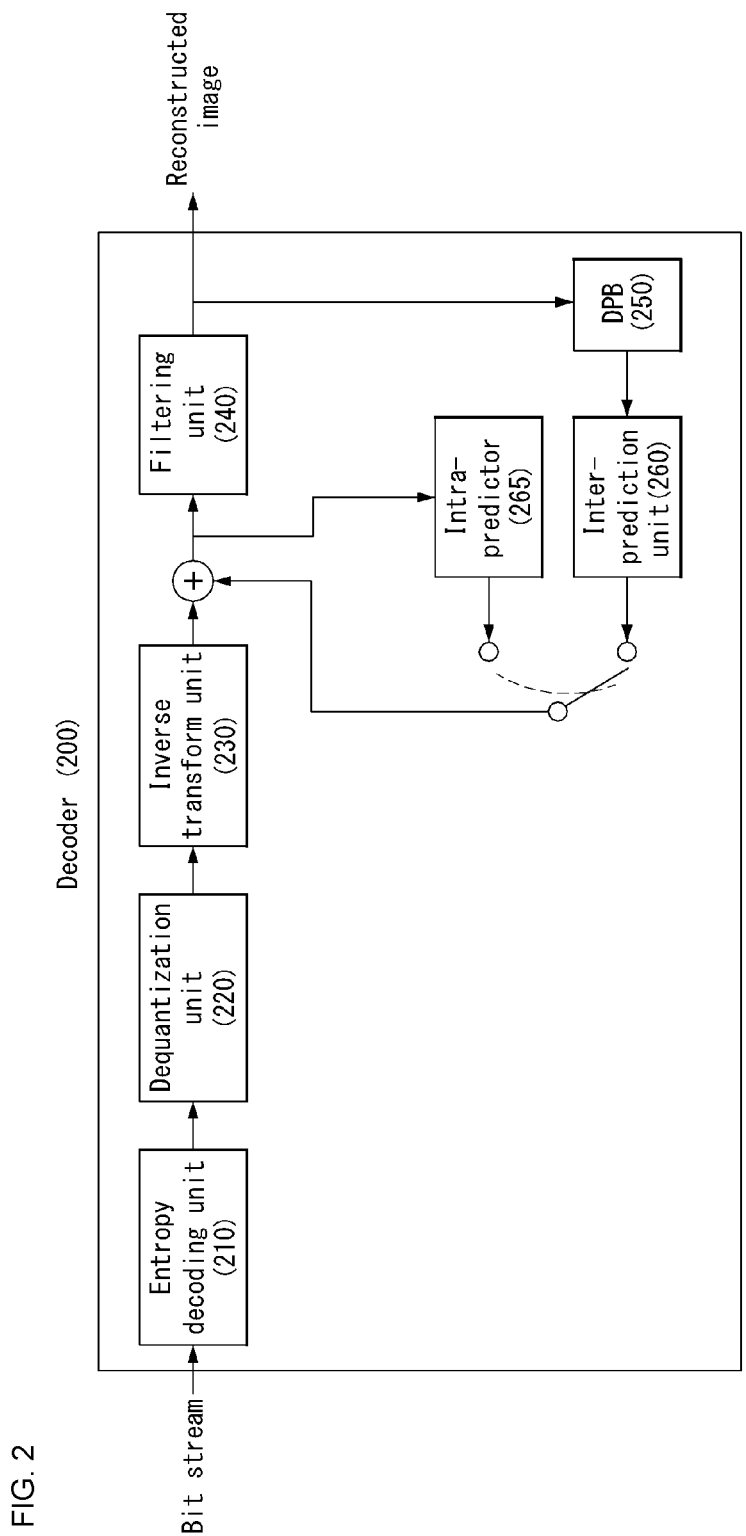
FIG. 2 is a block diagram illustrating the configuration of a decoder for decoding a video signal according to an embodiment of the present disclosure.

FIG. 2 is a schematic block diagram of a decoder in which decoding of a video signal is performed as an embodiment to which the present disclosure is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder 200 may be reproduced through a reproduction device.

The decoder 200 may receive the signal output from the encoder 100 of FIG. 1 and the received signal may be entropy-decoded through the entropy decoding unit 210.

The dequantization unit 220 obtains the transform coefficient from an entropy-decoded signal by using quantization step size information.

The inverse transform unit 230 inversely transforms the transform coefficient to obtain the residual signal.

Here, the present disclosure provides a method for configuring a transform combination for each transform configuration group divided by at least one of a prediction mode, a block size or a block shape and the inverse transform unit 230 may perform inverse transform based on the transform combination configured by the present disclosure. Further, the embodiments described in the present disclosure may be applied.

The inverse transform unit 230 may perform the following embodiments.

The present disclosure provides a method and a structure for dividing a specific area of a transform coefficient block into 4×4 blocks and then applying an individual secondary transform for each divided block and a method for allocating and sharing a secondary transform to the divided blocks.

The inverse transform unit 230 may derive a secondary transform corresponding to a specific area within the transform coefficient block, perform an inverse secondary transform for each of subblocks within the specific area by using the secondary transform, and perform an inverse primary transform for a block which the inverse secondary transform is applied. Here, the specific area represents an area including a top-left block of the transform coefficient block.

As an embodiment, the specific area is divided into 4×4 subblocks and the inverse secondary transform is performed for each of the 4×4 subblocks.

As an embodiment, the same 4×4 secondary transform is applied or different 4×4 secondary transforms are applied to the 4×4 subblocks based on at least one of locations or prediction modes of the subblocks.

As an embodiment, whether the specific area is split into 4×4 subblocks is determined based on a size of the transform coefficient block.

As an embodiment, the method further includes checking whether the number of non-zero transform coefficients within in the 4×4 subblocks is equal to or more than a specific threshold, in which whether the 4×4 secondary transform is applied to the 4×4 subblocks is determined according to the checking result.

As an embodiment, when the number of non-zero transform coefficients within the 4×4 subblock is equal to or more than the specific threshold, the 4×4 secondary transform is applied to the 4×4 subblock and otherwise, the 4×4 secondary transform is not be applied to the 4×4 subblock.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

Figure 3A:
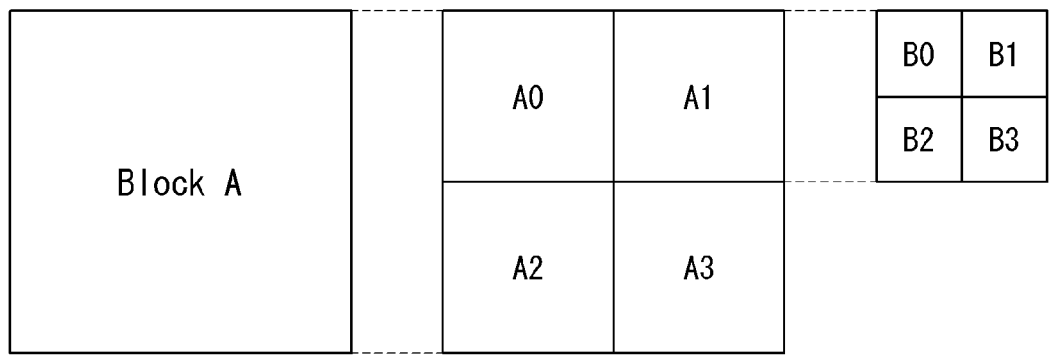
FIG. 3A through 3D illustrate embodiments to which the disclosure may be applied.
Figure 3B:
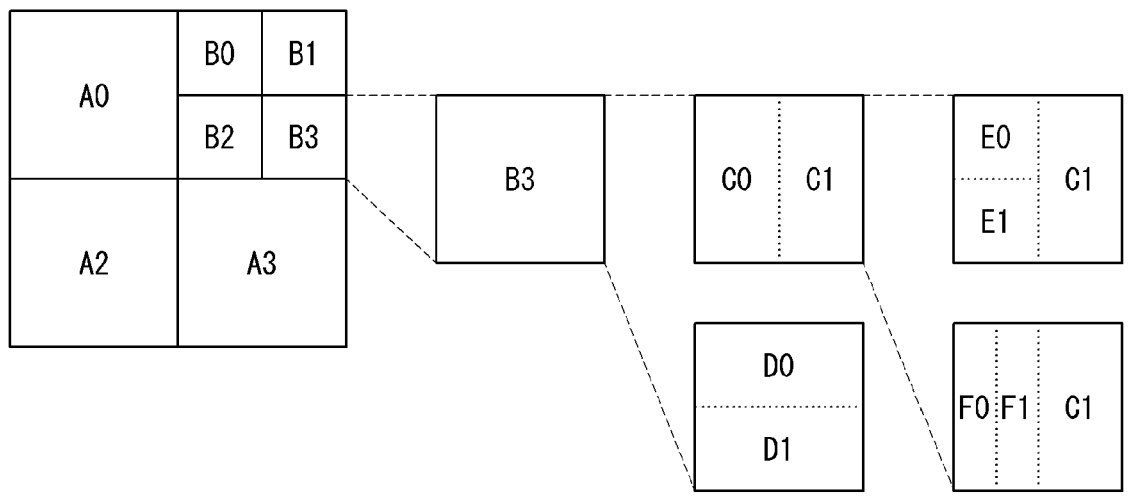
Figure 3C:
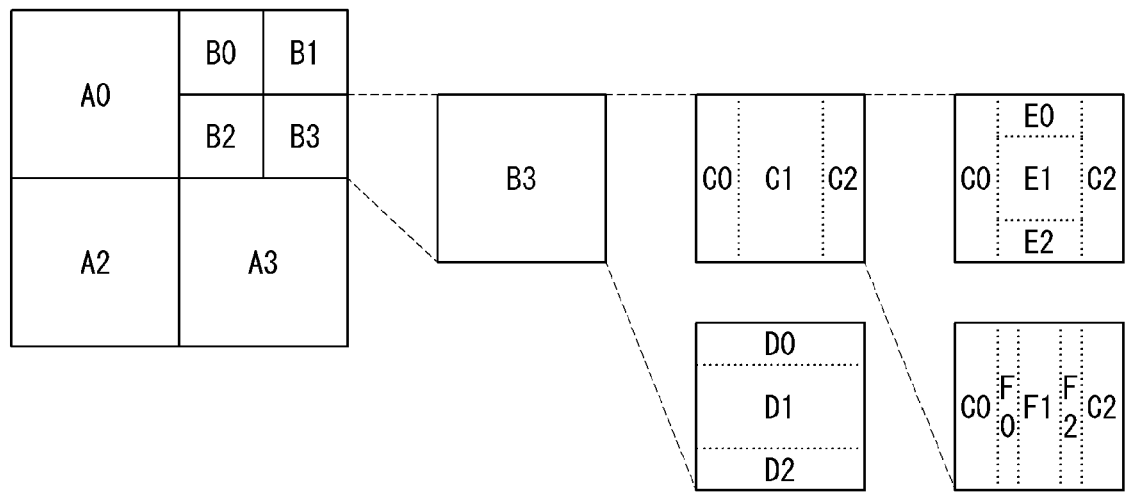
Figure 3D:
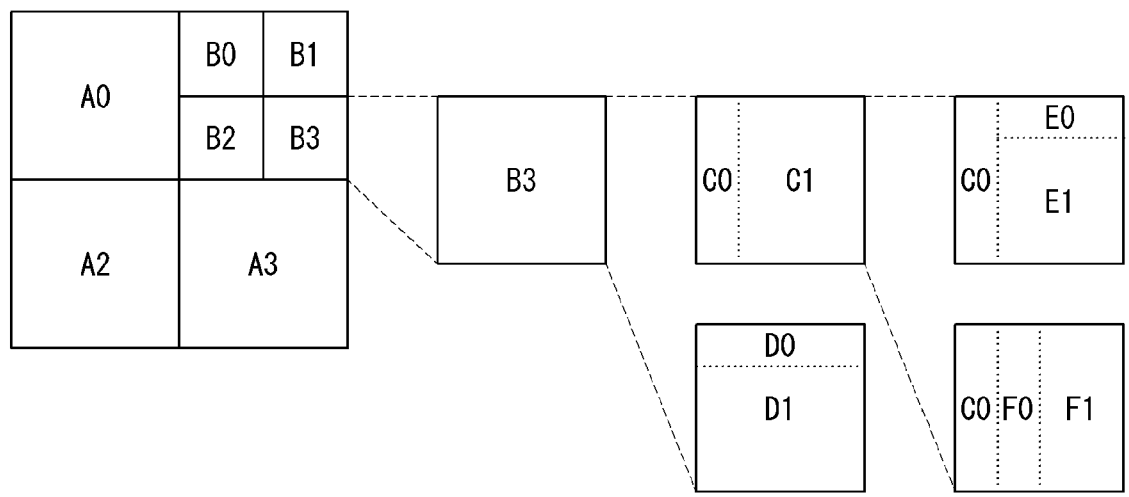

FIGS. 3A through 3D illustrate embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×½N, 2N×N, 2N×½N) and a vertical TT (½N×2N, N×2N, ½N×2N). The AT may have four types of splits of a horizontal-up AT (2N×½N, 2N×³⁄₂N), a horizontal-down AT (2N×³⁄₂N, 2N×½N), a vertical-left AT (½N×2N, ³⁄₂N×2N), and a vertical-right AT (³⁄₂N×2N, ½N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

Figure 4:
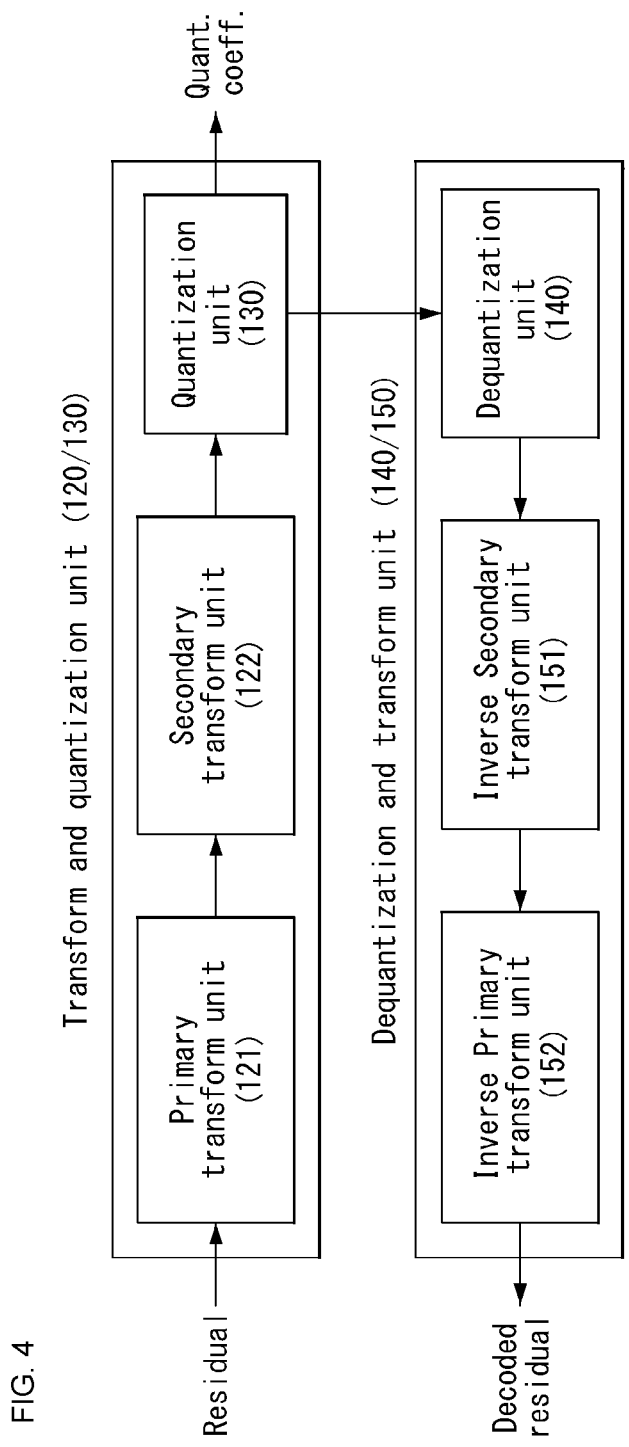
FIG. 4 is an embodiment to which the disclosure is applied and illustrates a schematic block diagram of a transform and quantization unit 120/130 and a dequantization and transform unit 140/150 within an encoder.
Figure 5:
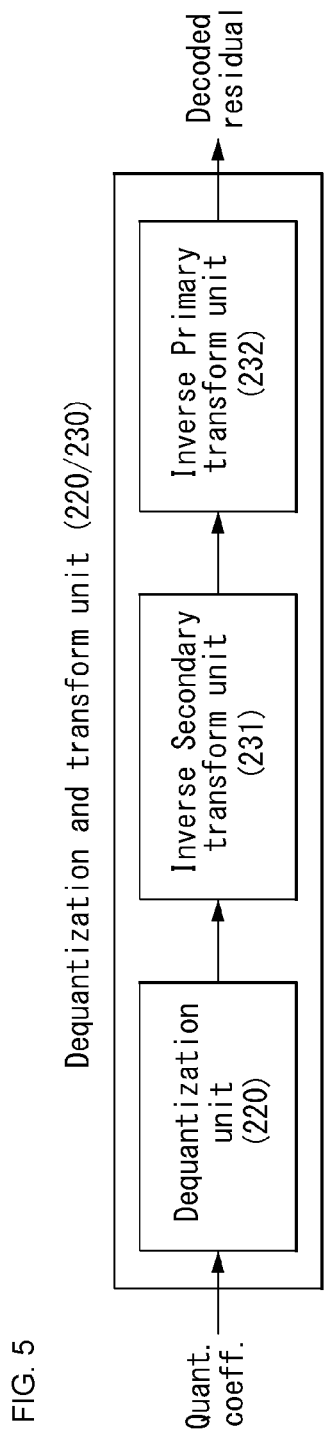
FIG. 5 is an embodiment to which the disclosure is applied and illustrates a schematic block diagram of a dequantization and transform unit 220/230 within a decoder.

FIGS. 4 and 5 are embodiments to which the disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the disclosure, when a transform is performed, the transform may be performed through a plurality of steps. For example, as in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT2") may be applied to the primary transform.

Alternatively, a discrete sine transform-type 7 (hereinafter called "DST7") may be applied to a specific case. For example, in the intra prediction mode, the DST7 may be applied to a 4×4 block.

Further, the primary transform may adopt combinations of various transforms DST 7, DCT 8, DST 1, and DCT 5 of the multiple transform selection (MTS). For example, FIG. 6 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

As another embodiment, the secondary transform may adopt combinations of various transforms DST 7, DCT 8, DST 1, and DCT 5 of the multiple transform selection (MTS). For example, FIG. 6 may be adopted.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

The quantization unit 130 may perform quantization for the secondary transformed signal.

The dequantization and inverse transform units 140 and 150 perform the above-described process in reverse, and a redundant description thereof will be omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. Here, the inverse secondary transform represents an inverse transform of the secondary transform described in FIG. 4 above.

As another embodiment, the secondary transform may adopt combinations of various transforms DST 7, DCT 8, DST 1, and DCT 5 of the multiple transform selection (MTS). For example, FIG. 6 may be adopted.

The inverse primary transform unit 232 performs an inverse primary transform for the inverse secondary transformed signal (or block) and obtains the residual signal. Here, the inverse primary transform represents the inverse transform of the primary transform described in FIG. 4 above.

As an embodiment, the primary transform may adopt combinations of various transforms DST 7, DCT 8, DST 1, and DCT 5 of the multiple transform selection (MTS). For example, FIG. 6 may be adopted.

As an embodiment of the present disclosure, the DST 7 may be applied to the primary transform.

As an embodiment of the present disclosure, the DCT 8 may be applied to the primary transform.

The present disclosure may provide a method for configuring a transform combination for each transform configuration group divided by at least one of a prediction mode, a block size or a block shape and the inverse primary transform unit 232 may perform the inverse transform based on the transform combination configured by the present disclosure. Further, the embodiments described in the present disclosure may be applied.

FIG. 6 is a table showing a transform configuration group to which Multiple Transform Selection (MTS) is applied as an embodiment to which the present disclosure is applied.

Transform Configuration Group to Which Multiple Transform Selection (MTS) is Applied In the present disclosure, a j-th transform combination candidate for transform configuration group $G_i$ is represented by a pair shown in Equation 1 below.

$$(H(G_i,j), V(G_i,j))$$ [Equation 1]

Here, $H(G_i, j)$ indicates the horizontal transform for the j-th candidate, and $V(G_i, j)$ indicates the vertical transform for the j-th candidate. For example, in FIG. 6, $H(G_3, 2)$=DST 7, $V(G_3, 2)$=DCT 8 may be represented. Depending on a context, a value assigned to $H(G_i, j)$ or $V(G_i, j)$ may be a nominal value to distinguish transformations, as in the example above or may be an index value indicating the transform or may be a 2 dimensional (D) matrix for the transform.

Further, in the present disclosure, a 2D matrix value for DCT and DST may be represented as shown in Equation 2 and 3 below.

$$\text{DCT type 2: } C_N^{II}, \text{ DCT type 8:} C_N^{VIII}$$ [Equation 2]

$$\text{DCT type 7: } S_N^{VII}, \text{ DST type 4: } S_N^{IV}$$ [Equation 3]

Here, whether the transform is DST or DCT is represented by S or C, a type number is represented as a superposition in the form of a Roman number, and N of a lower subscript indicates that the transform is an N×N transform. Further, in the 2D matrix such as the $C_N^{II}$ and $S_N^{IV}$, it is assumed that column vectors form a transform basis.

Referring to FIG. 6 above, the transform configuration groups may be determined based on the prediction mode and the number of groups may be a total of six groups G0 to G5. In addition, G0 to G4 correspond to a case where intra prediction is applied, and G5 represents transform combinations (or transform sets and transform combination sets) applied to the residual block generated by the inter prediction.

One transform combination may include a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and the transform combination index may be encoded and transmitted from the encoder to the decoder.

As an embodiment, the residual data (or residual signal) obtained through the intra prediction may have different statistical characteristics according to the intra prediction mode. Therefore, as illustrated in FIG. 6 above, transforms other than a general cosine transform may be applied to each intra prediction mode.

Referring to FIG. 6 above, a case of using 35 intra prediction modes and a case of using 67 intra prediction modes are illustrated. A plurality of transform combinations may be applied to each transform configuration group divided in each intra prediction mode column. For example, the plurality of transform combinations may include four (row direction transforms and column direction transforms) combinations. As a specific example, DST-7 and DST-5 may be applied in a row (horizontal) direction and a column (vertical) direction in group 0, and as a result, a total of four combinations are available.

Since a total of four transform kernel combinations may be applied to each intra prediction mode, a transform combination index for selecting one of the transform kernel combinations may be transmitted every transform unit. In the present disclosure, the transform combination index may be called MTS index and expressed as mts_idx.

Further, in addition to the transform kernels presented in FIG. 6 above, a case where DCT2 is optimal for both the row direction and the column direction due to characteristics of the residual signal may occur. Accordingly, the MTS flag is defined for each coding unit to adaptively perform the transform. Here, when the MTS flag is 0, DCT2 may be applied to both the row direction and the column direction and when the MTS flag is 1, one of four combinations may be selected or determined through the MTS index.

As an embodiment, when the MTS flag is 1, if the number of non-zero transform coefficients for one transform unit is not greater than a threshold, the DST-7 may be applied to both the row direction and the column direction without applying the transform kernels of FIG. 6 above. For example, the threshold may be configured to 2, which may be configured differently based on the block size or the size of the transform unit. This is also applicable to other embodiments in the present disclosure.

As an embodiment, if the number of non-zero transform coefficients is not greater than the threshold by first parsing the transform coefficient values, an additional information transmission amount may be reduced by applying the DST-7 without parsing the MTS index.

As an embodiment, when the MTS flag is 1, if the number of non-zero transform coefficients is greater than the threshold for one transform unit, the MTS index may be parsed and the horizontal transform and the vertical transform may be determined based on the MTS index.

As an embodiment, the MTS may be applied only when both a width and a height of the transform unit are equal to or smaller than 32.

As an embodiment, FIG. 6 above may be preconfigured through off-line training.

As an embodiment, the MTS index may be defined as one index which may simultaneously indicate the horizontal transform and the vertical transform. Alternatively, the MTS index may separately define a horizontal transform index and a vertical transform index.

As an embodiment, the MTS flag or the MTS index may be defined in at least one level of a sequence, a picture, a slice, a block, a coding unit, a transform unit, or a prediction unit. For example, the MTS flag or the MTS index may be defined in at least one level of a sequence parameter set (SPS), the coding unit, or the transform unit.

As another embodiment, the transform combination (horizontal transform or vertical transform) corresponding to the transform index may be configured without dependence on the MTS flag, the prediction mode, and/or a block shape. For example, the transform combination may be configured by at least one of DCT2, DST7, and/or DCT8. As a specific example, when the transform index is 0, 1, 2, 3, or 4, each transform combination may be (DCT2, DCT2), (DST7, DST7), (DCT8, DST7), (DST7, DCT8), or (DCT8, DCT8).

Figure 7:
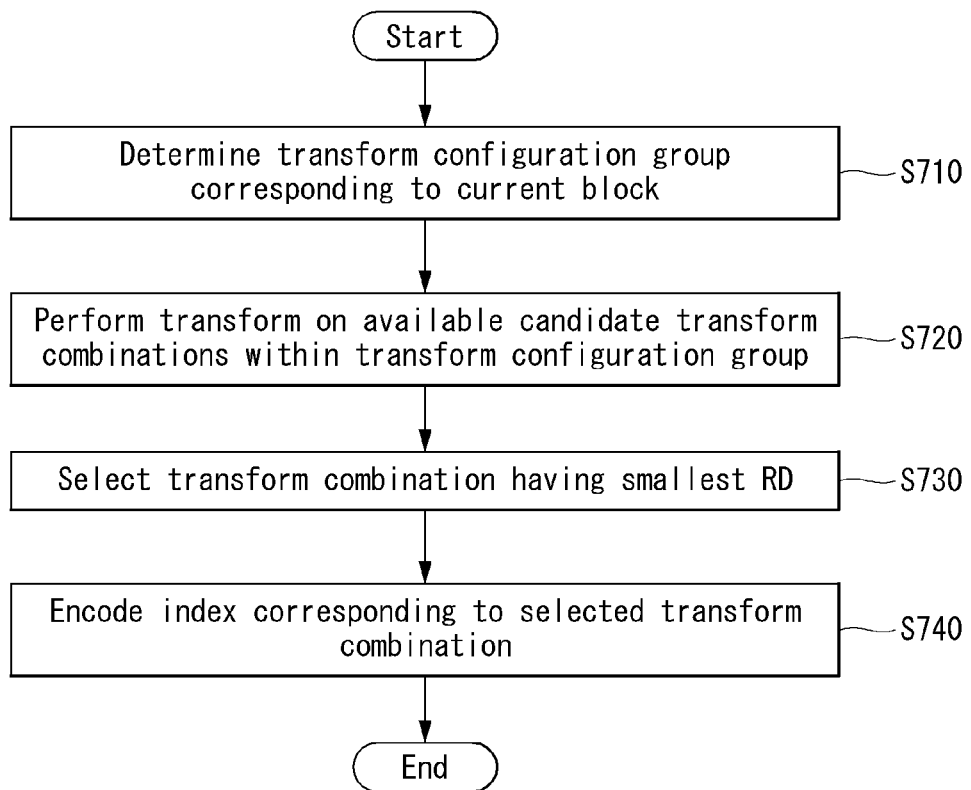
FIG. 7 is a flowchart showing an encoding process in which Multiple Transform Selection (MTS) is performed as an embodiment to which the present disclosure is applied.

FIG. 7 is a flowchart showing an encoding process in which Multiple Transform Selection (MTS) is performed as an embodiment to which the present disclosure is applied.

In the present disclosure, an embodiment in which transforms are a separately applied to the horizontal direction and the vertical direction is basically described, but the transform combination may be constituted even by non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 above may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform configuration group corresponding to the current block (S710). Here, the transform configuration group may mean the transform configuration group of FIG. 6 above and the present disclosure is not limited thereto and the transform configuration group may include other transform combinations.

The encoder may perform a transform for candidate transform combinations available in the transform configuration group (S720).

As a result of performing the transform, the encoder may determine or select a transform combination having a smallest rate distortion (RD) cost (S730).

The encoder may encode the transform combination index corresponding to the selected transform combination (S740).

Figure 8:
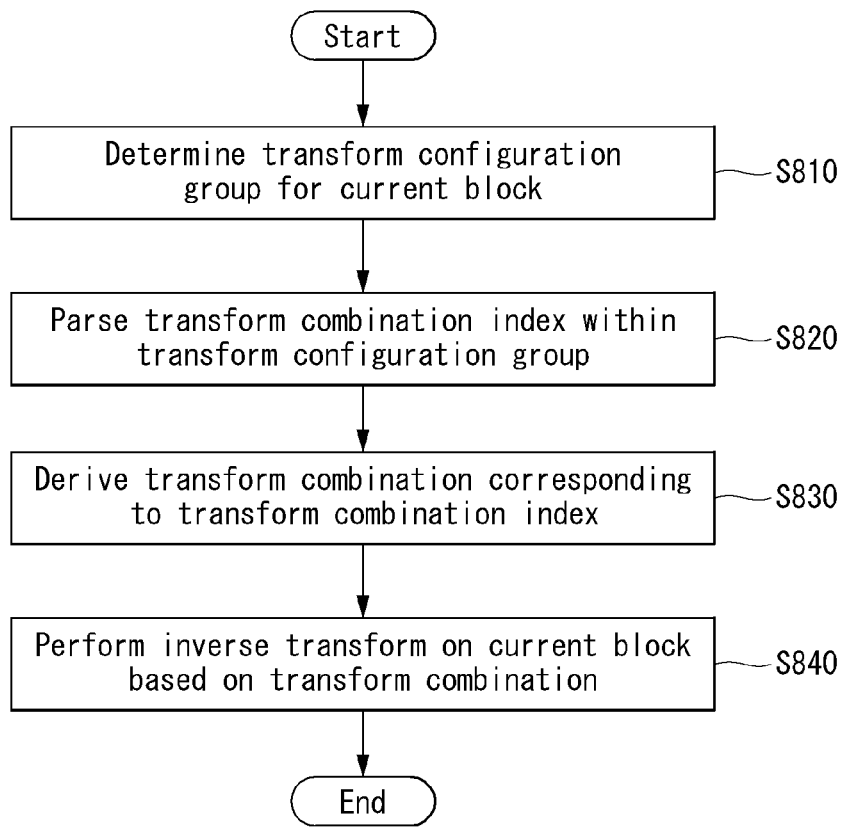
FIG. 8 is a flowchart showing a decoding process in which Multiple Transform Selection (MTS) is performed as an embodiment to which the present disclosure is applied.

FIG. 8 is a flowchart showing a decoding process in which Multiple Transform Selection (MTS) is performed as an embodiment to which the present disclosure is applied.

First, the decoder may determine the transform configuration group for the current block (S810).

The decoder may parse (or obtain) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). Here, the transform combination may include the horizontal transform and the vertical transform, and may include at least one of the DST-7 or the DCT-8.

Further, the transform combination may mean the transform combination described in FIG. 6 above, but the present disclosure is not limited thereto. That is, the transform combination may be configured by other transform combinations depending on other embodiments in the present disclosure.

The decoder may perform the inverse transform for the current block based on the transform combination (S840). When the transform combination includes the row (horizontal) transform and the column (vertical) transform, the column (vertical) transform may be applied after applying the row (horizontal) transform first. However, the present disclosure is not limited thereto and the transform order may be reversed or when the transform combination includes the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each column and then applied to each row.

As an embodiment, in respect to the vertical transform or the horizontal transform, different transform may be applied to each row and/or to each column.

As an embodiment, the transform combination index may be obtained based on the MTS flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform combination index may be obtained when the number of non-zero transform coefficients is greater than the threshold.

As an embodiment, the MTS flag or the MTS index may be defined in at least one level of a sequence, a picture, a slice, a block, a coding unit, a transform unit, or a prediction unit.

As an embodiment, the inverse transform may be applied only when both the width and the height of the transform unit are equal to or smaller than 32.

On the other hand, as another embodiment, a process of determining the transform configuration group and a process of parsing the transform combination index may be performed at the same time. Alternatively, step S810 above may be preconfigured and omitted in the encoder and/or the decoder.

Figure 9:
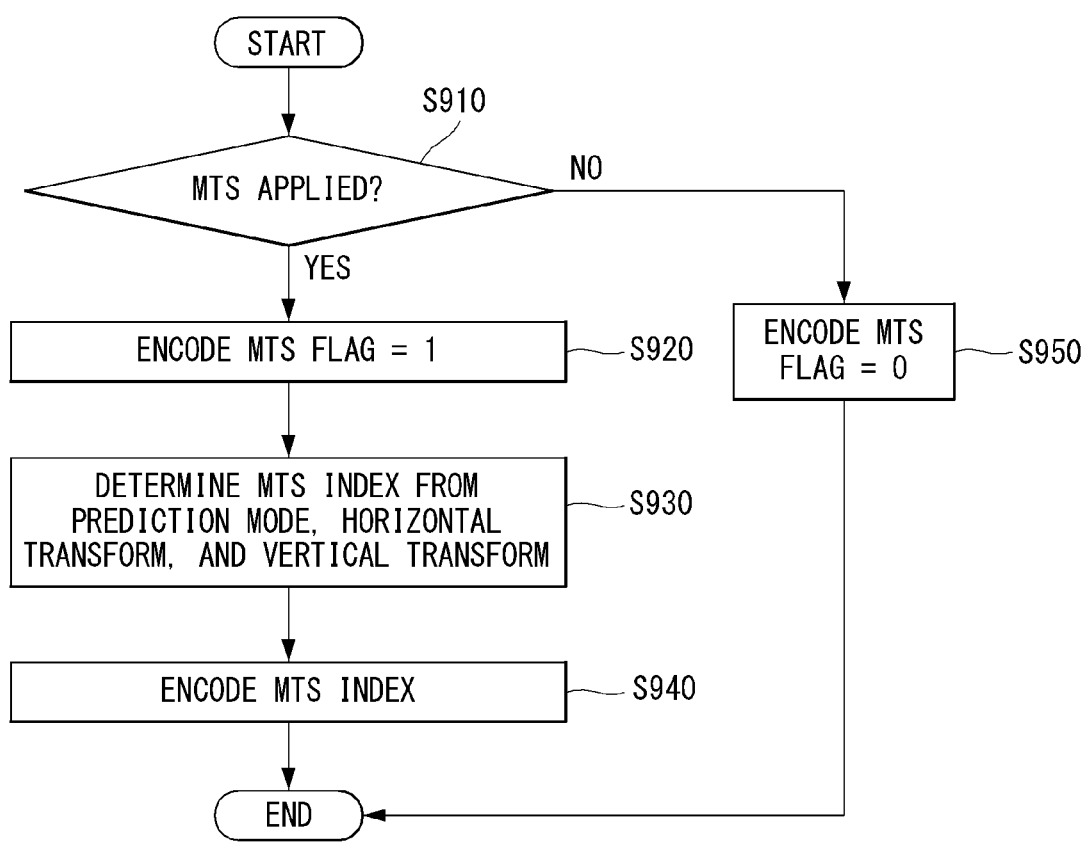
FIG. 9 is a flowchart for describing a process of encoding an MTS flag and an MTS index as an embodiment to which the present disclosure is applied.

FIG. 9 is a flowchart for describing a process of encoding an MTS flag and an MTS index as an embodiment to which the present disclosure is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). Here, the MTS index may mean an index indicating any one of the plurality of transform combinations for each intra prediction mode and the MTS index may be transmitted for each transform unit.

When the MTS index is determined, the encoder may encode the MTS index (S940).

On the other hand, when the Multiple Transform Selection (MTS) is not applied, the encoder may encode MTS flag=0 (S950).

Figure 10:
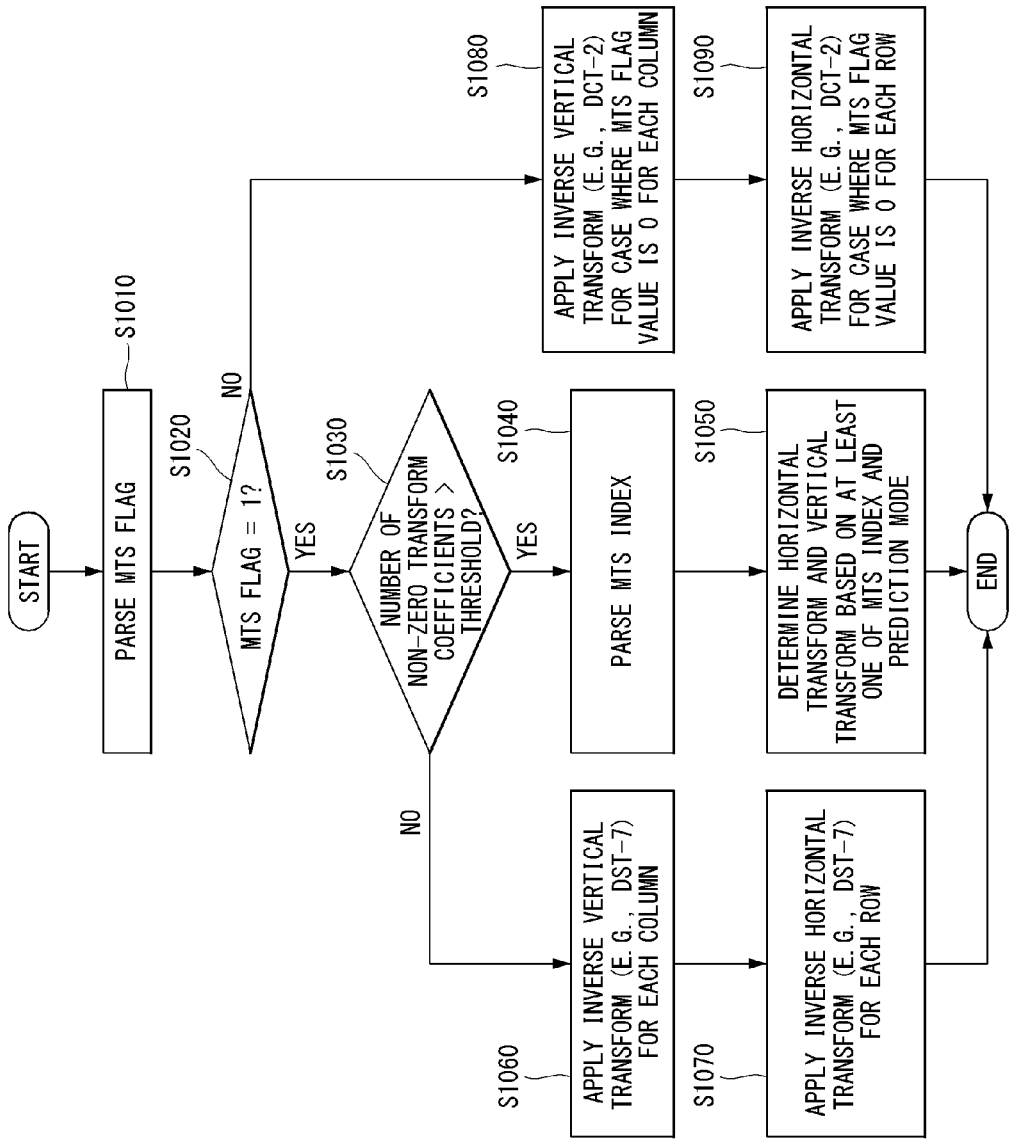
FIG. 10 is a flowchart for describing a decoding process in which a horizontal transform or vertical transform is applied to a row or a column based on an MTS flag and an MTS index as an embodiment to which the present disclosure is applied.

FIG. 10 is a flowchart for describing a decoding process in which a horizontal transform or vertical transform is applied to a row or a column based on an MTS flag and an MTS index as an embodiment to which the present disclosure is applied.

The decoder may parse the MTS flag from the bitstream (S1010). Here, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be configured to 2, which may be configured differently based on the block size or the size of the transform unit.

When the number of non-zero transform coefficients is greater than the threshold, the decoder may parse the MTS index (S1040). Here, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6 above, but the present disclosure is limited thereto.

The decoder may derive or determine the horizontal transform and the vertical transform based on at least one of the MTS index and the prediction mode (S1050).

Alternatively, the decoder may derive the transform combination corresponding to the MTS index. For example, the decoder may derive or determine the horizontal transform and the vertical transform corresponding to the MTS index.

Meanwhile, when the number of non-zero transform coefficients is not greater than the threshold, the decoder may apply a preconfigured vertical inverse transform for each column (S1060). For example, the vertical inverse transform may be the inverse transform of the DST7.

In addition, the decoder may apply a preconfigured horizontal inverse transform for each row (S1070). For example, the horizontal inverse transform may be the inverse transform of the DST7. That is, when the number of non-zero transform coefficients is not greater than the threshold, a transform kernel preconfigured by the encoder or decoder may be used. For example, the transform kernel that is not defined in the transform combination table illustrated in FIG. 6 above, but is widely used may be used.

Meanwhile, when the MTS flag is 0, the decoder may apply the preconfigured vertical inverse transform for each column (S1080). For example, the vertical inverse transform may be the inverse transform of the DCT2.

In addition, the decoder may apply the preconfigured horizontal inverse transform for each row (S1090). For example, the horizontal inverse transform may be the inverse transform of the DCT2. That is, when the MTS flag is 0, the transform kernel preconfigured in the encoder or decoder may be used. For example, the transform kernel that is not defined in the transform combination table illustrated in FIG. 6 above, but is widely used may be used.

Figure 11:
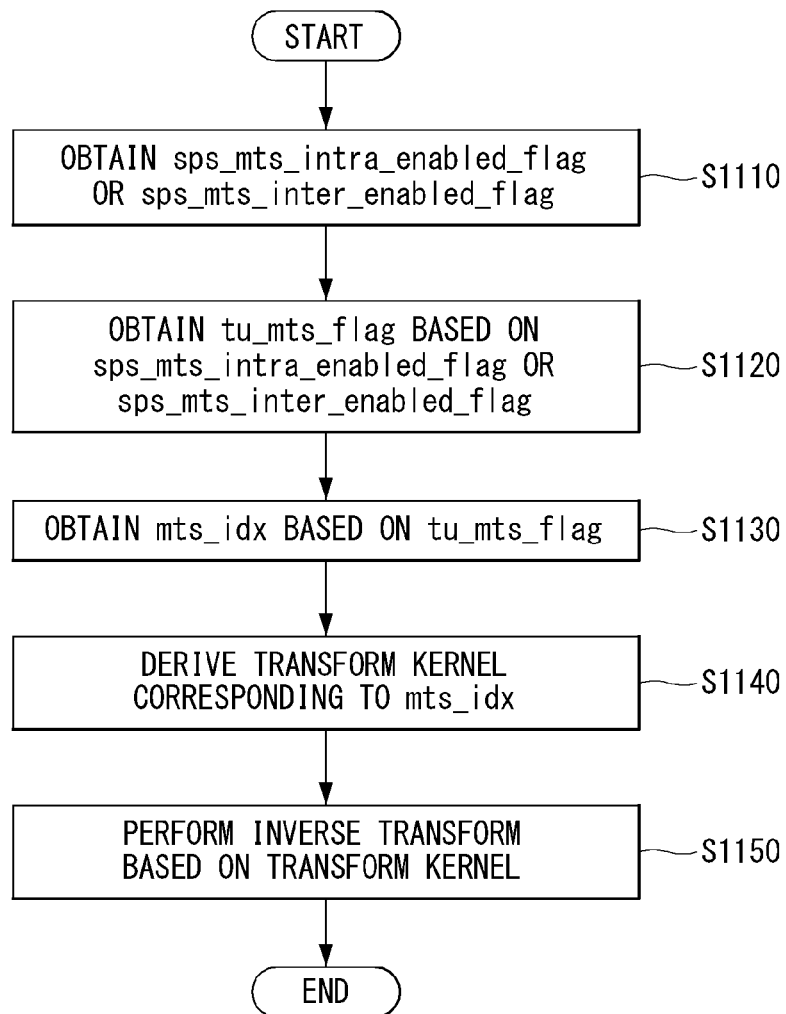
FIG. 11 is a flowchart of performing an inverse transform based on a transform related parameter as an embodiment to which the present disclosure is applied.

FIG. 11 is a flowchart of performing an inverse transform based on a transform related parameter as an embodiment to which the present disclosure is applied.

The decoder to which the present disclosure is applied may obtain sps_mts_intra_enabled_flag or sps_mts_inter_enabled_flag (S1110). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the inter coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. Here, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present disclosure may be applied to the tu_mts_flag.

The decoder may obtain mts_idx based on tu_mts_flag (S113). For example, when tu_mts_flag=1, the decoder may obtain mts_idx. Here, mts_idx indicates which transform kernel is applied to luma residual samples along the horizontal and/or vertical direction of a current transform block.

For example, at least one of the embodiments of the present disclosure may be applied to mts_idx. As a specific example, at least one of the embodiments of FIG. 6 above may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present disclosure is not limited thereto, and the same transform kernel may be applied to the horizontal transform and the vertical transform.

As an embodiment, mts_idx may be defined as shown in Table 1 below.

TABLE 1

| mts_idx[x0][y0] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In addition, the decoder may perform the inverse transform based on the transform kernel (S1150).

Each of the above embodiments may be used, but the present disclosure is not limited thereto, and may be used in combination with the above embodiments and other embodiments of the present disclosure.

As another embodiment of the present disclosure, a decoding process of performing the transform process is described.

The decoder may check a transform size nTbS (S10). Here, the transform size nTbS may be a variable representing a horizontal sample size of scaled transform coefficients.

The decoder may check a transform kernel type trType (S20). Here, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1 above, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix multiplication based on at least one of the transform size nTbS or the transform kernel type (S30).

As another example, when the transform kernel type is 1 and the transform size is 4, a predetermined transform matrix 1 may be applied when performing the transform matrix multiplication.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix multiplication.

As another example, when the transform kernel type is 1 and the transform size is 32, a predefined transform matrix 4 may be applied when performing the transform matrix multiplication.

Similarly, when the transform kernel type is 2 and the transform size is 4, 8, 16, or 32, predefined transform matrices 5, 6, 7, and 8 may be applied, respectively.

Here, each of the predefined transform matrices 1 to 8 may correspond to any one of various types of transform matrices. As an example, the transform matrix of the type illustrated in FIG. 6 above may be applied.

The decoder may derive a transform sample based on the transform matrix multiplication (S40).

FIG. 12 is a table showing allocation of a transform set for each intra prediction mode in an NSST as an embodiment to which the present disclosure is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode may have a different transform set and the corresponding transform set may include two transforms. In respect to the remaining directional modes, each transform set may include three transforms. However, the present disclosure is not limited thereto, and each transform set may include a plurality of transforms.

Figure 13:
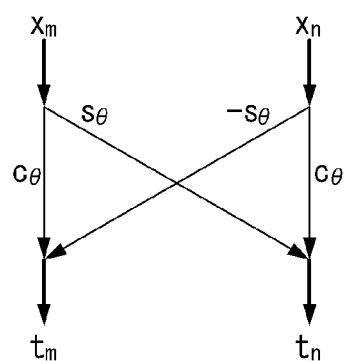
FIG. 13 is a calculation flow diagram for Givens rotation as an embodiment to which the present disclosure is applied.

FIG. 13 is a calculation flow diagram for Givens rotation as an embodiment to which the present disclosure is applied.

As another embodiment, the NSST may not be applied to the entire primary transformed block but may be applied only to a top-left 8×8 area. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

The NSST, the 4×4 NSST, and the 8×8 NSST will be described in more detail with reference to FIGS. 12 to 15 and other embodiments in the present disclosure.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_\theta = \begin{bmatrix} \cos\theta & -\sin\theta \\ \sin\theta & \cos\theta \end{bmatrix} \quad \text{[Equation 4]}$$

$$t_m = x_m \cos\theta - x_n \sin\theta$$

$$t_n = x_m \sin\theta + x_n \cos\theta \quad \text{[Equation 5]}$$

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

Figure 14:
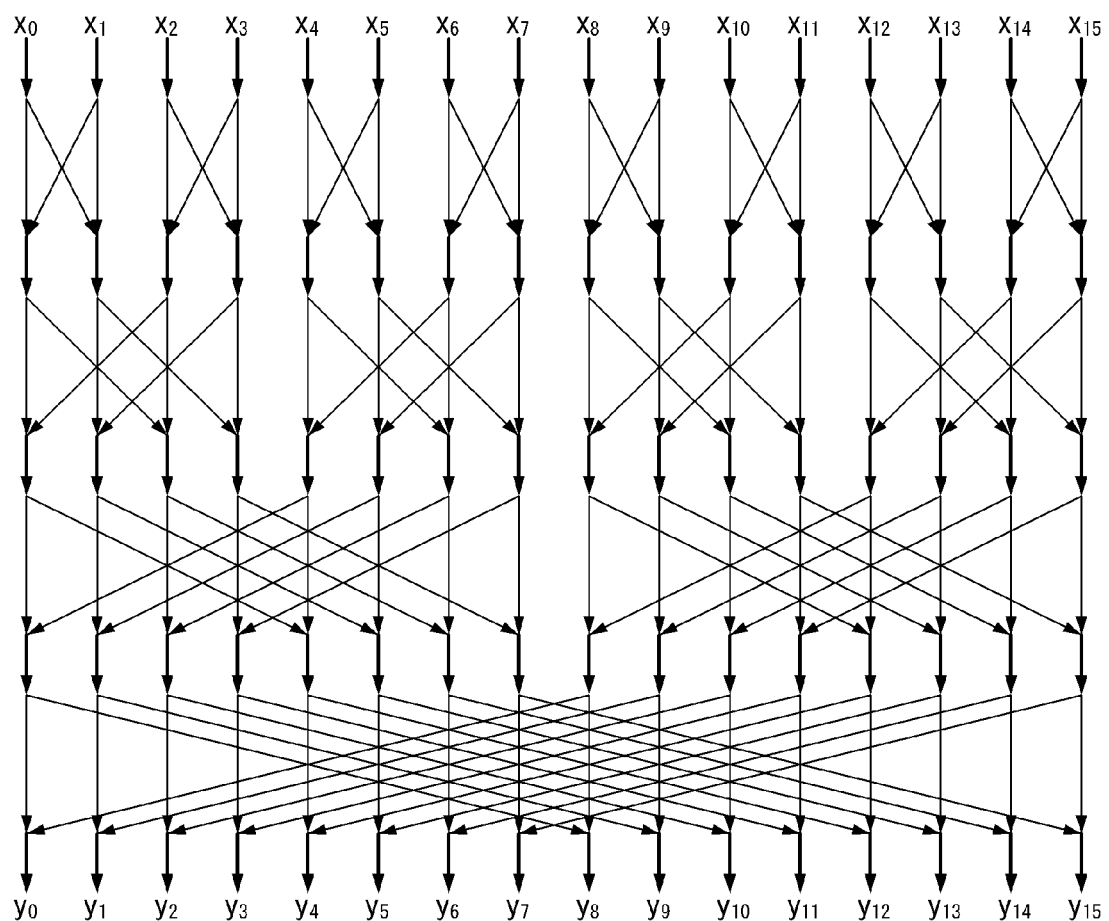
FIG. 14 illustrates one round configuration in 4×4 NSST constituted by a givens rotation layer and permutations as an embodiment to which the present disclosure is applied.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

Figure 15A:
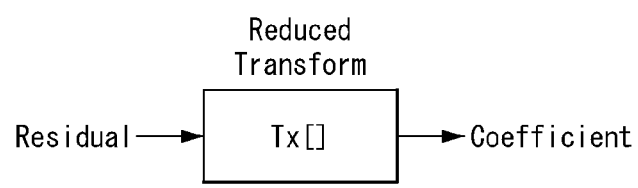
FIGS. 15A and 15B are block diagrams for describing operations of a forward reduced transform and an inverse reduced transform as an embodiment to which the present disclosure is applied.
Figure 15B:
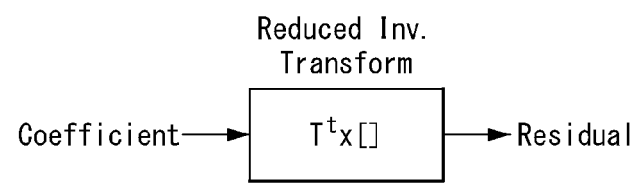

FIGS. 15A and 15B are block diagrams for describing operations of a forward reduced transform and an inverse reduced transform as an embodiment to which the present disclosure is applied.

Reduced Secondary Transform (RST)

When it is assumed that an orthogonal matrix representing one transform has an N×N form, a reduced transform (hereinafter, referred to as 'RT') leaves only R transform basis vectors among N transform basis vectors (R<N). A matrix for forward RT generating the transform coefficients is given by Equation 6 below.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$ [Equation 6]

Since a matrix for an inverse RT becomes a transpose matrix of the forward RT matrix, the application of the forward RT and the inverse RT is illustrated as in FIGS. 15A and 15B above.

When a case of applying the RT to the top-left 8×8 block of the transform block which goes through the primary transform is assumed, the RT may be referred to as an 8×8 reduced secondary transform (8×8 RST).

When the R value of Equation 6 above is 16, the forward 8×8 RST has a 16×64 matrix form and the inverse 8×8 RST has a 64×16 matrix form.

Further, the transform set configuration which is the same as that illustrated in FIG. 12 above may be applied even to the 8×8 RST. That is, a corresponding 8×8 RST may be applied according to the transform set in FIG. 12 above.

As an embodiment, when one transform set includes two or three transforms according to the intra prediction mode in FIG. 12 above, one of a maximum of 4 transforms including a case of not applying the secondary transform may be configured to be selected. Here, one transform may be regarded as an identity matrix.

When indexes of 0, 1, 2, and 3 are assigned to the four transforms, respectively, a syntax element called an NSST index may be signaled for each transform block, thereby designating a corresponding transform. That is, in the case of the NSST, the 8×8 NSST may be designated for the 8×8 top-left block through the NSST index and the 8×8 RST may be designated in an RST configuration. Further, in this case, index 0 may be allocated to a case where the identity matrix, i.e., the secondary transform is not applied.

When the forward 8×8 RST shown in Equation 6 above is applied, 16 valid transform coefficients are generated, and as a result, it may be regarded that 64 input data constituting an 8×8 region are reduced to 16 output data. From the perspective of a two-dimensional region, only a one-quarter area is filled with the valid transform coefficient. Accordingly, a 4×4 top-left area in FIG. 16 may be filled with 16 output data obtained by applying the forward 8×8 RST.

Figure 16:
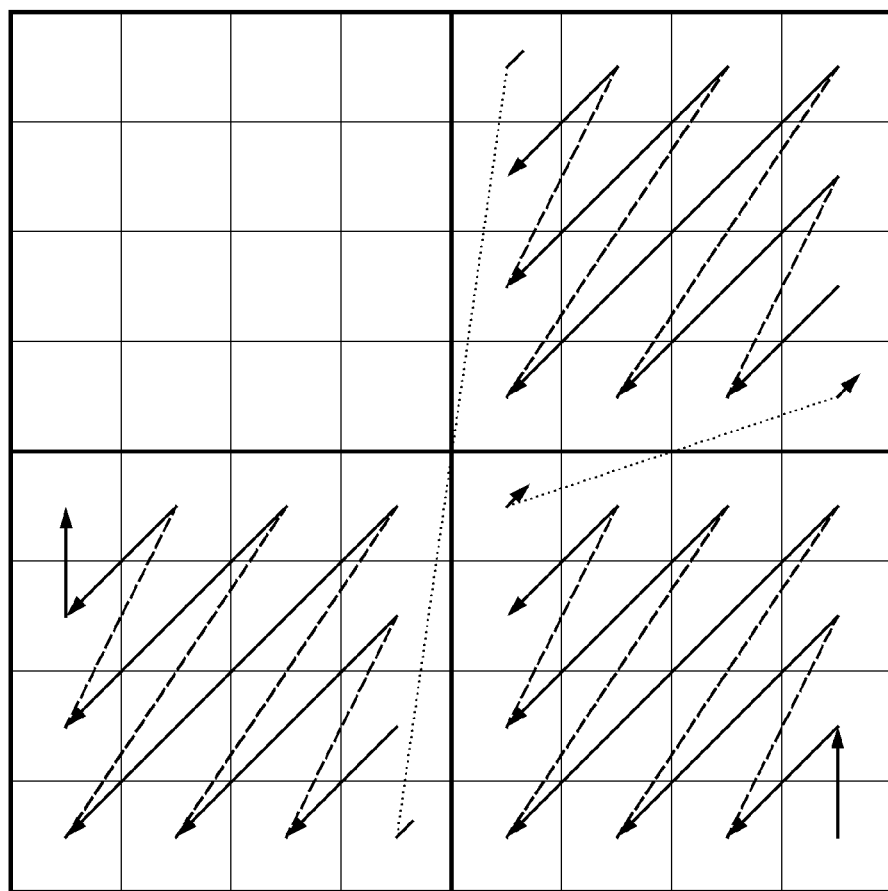
FIG. 16 is a diagram illustrating a process of performing an inverse scan from $64^{th}$ to $17^{th}$ according to an inverse scan order as an embodiment to which the present disclosure is applied.

FIG. 16 is a diagram illustrating a process of performing an inverse scan from $64^{th}$ to $17^{th}$ according to an inverse scan order as an embodiment to which the present disclosure is applied.

FIG. 16 above illustrates scanning from the $17^{th}$ coefficient to the $64^{th}$ coefficient when the forward scanning order starts from 1 (in the forward scan order). However, FIG. 16 above illustrates the inverse scan and this illustrates performing the inverse scanning from the $64^{th}$ coefficient to the $17^{th}$ coefficient.

Referring to FIG. 16 above, the top-left 4×4 region is a region of interest (ROI) to which the valid transform coefficient is allocated and the remaining region is empty. That is, a value of 0 may be allocated to the remaining region by default.

If there is a valid transform coefficient other than 0 in a region other than the ROI region of FIG. 16 above, this means that the 8×8 RST is not applied, and as a result, in this case, NSST index coding corresponding thereto may be omitted.

Conversely, if there is no non-zero transform coefficient in the region other than the ROI region of FIG. 16 above (if the 8×8 RST is applied, when 0 is allocated to the region other than the ROI), there is a possibility that the 8×8 RST will be applied, and as a result, the NSST index may be coded.

As such, conditional NSST index coding may be performed after the residual coding process because it is necessary to check the existence of the non-zero transform coefficient.

The present disclosure proposes a method for dividing a specific area to which the secondary transform may be applied into smaller blocks and then applying the second conversion corresponding to each block. For example, the specific area may be a top-left area having up to 8×8 size, but the present disclosure is not limited thereto. The secondary transform may be the same or different for each divided block.

According to the present disclosure, since the reduced transform is applied, complexity reduction may be expected and the transforms between the divided blocks are shared to reduce even the number of used transforms. Furthermore, the method for dividing the blocks and allocated transform types may also be arbitrarily configured to adjust trade-off of coding performance and complexity.

Figure 17:
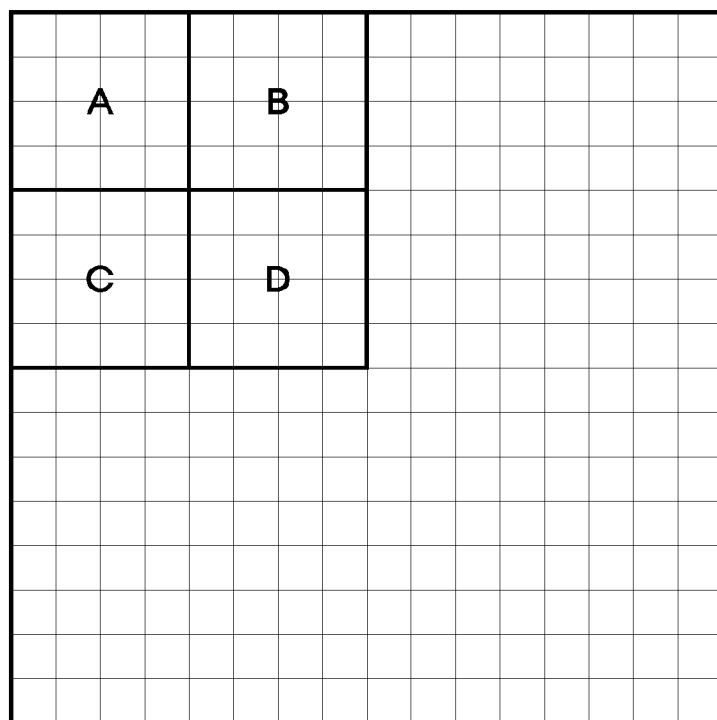
FIG. 17 illustrates 8×8 top-left divided areas to which a secondary transform is to be applied as an embodiment to which the present disclosure is applied.

FIG. 17 illustrates 8×8 top-left divided areas to which a secondary transform is to be applied as an embodiment to which the present disclosure is applied.

Embodiment 1: Dividing Specific Area of Transform Coefficient Block into 4×4 Blocks and then Applying Individual Secondary Transform to Each Divided Block For transform blocks of 8×8 or more, 8×8 NSST or 8×8 RST may be applied to the 8×8 top-left area and a transform block less than 8×8 may be divided into 4×4 blocks and then 4×4 NSST or another secondary transform (e.g., 4×4 LGT, etc.) may be applied to each of the 4×4 blocks.

Accordingly, the secondary transforms for the 8×8 block and the secondary transforms for the 4×4 block are separately required. For example, when the transform set of FIG. 12 above is used, a total of 103 8×8 secondary transforms and a total of 103 4×4 secondary transforms are required.

If the non-separable secondary transform is applied, the complexity of the secondary transform of the 8×8 block may be still larger than the secondary transform of the 4×4 block. For example, in the case of the transform of a square matrix form, since the 8×8 secondary transform is a 64×64 matrix and the 4×4 secondary transform is a 16×16 matrix, a 16-time difference in calculation amount and required memory amount may occur.

Therefore, if the 8×8 secondary transforms may be replaced with the 4×4 secondary transforms, the complexity may be reduced. The top-left 8×8 block to which the 8×8 secondary transform is applied may be divided into four 4×4 blocks as illustrated in FIG. 17.

In this case, different 4×4 secondary transforms may be applied to areas A, B, C, and D of FIG. 17 above. For example, when the transform set of FIG. 12 above is used and the 4×4 secondary transforms for A, B, C, and D are allocated for each of all 8×8 secondary transforms (that is, when the transform applied each corresponding area is different), the total number of 4×4 secondary transforms applied to the top-left 8×8 area becomes 103×4=412.

If some blocks among the blocks of FIG. 17 above are configured to share the secondary transform with each other, the total number of required transforms may be reduced.

When the transform applied to area X is referred to as Gx, the corresponding transforms may be expressed by $G_A$, $G_B$, $G_C$, and $G_D$ for FIG. 17 above. Examples in which the transform is shared are as follows.

Embodiment 1-1) $G_A=G_B=G_C=G_D$

In the present disclosure, the same 4×4 secondary transform may be applied to all 4×4 blocks constituting the top-left 8×8 area.

Embodiment 1-2) $G_A$, $G_B=G_C=G_D$

In the present disclosure, a separate 4×4 secondary transform may be allocated to the top-left 4×4 block and another 4×4 secondary transform may be identically applied to other remaining 4×4 blocks. As a specific example, when the 4×4 RST is applied, the 4×4 RST may be applied only to the top-left 4×4 area and the RST may not be applied (i.e., identity transform is applied) or a value of 0 may be allocated (i.e., zero matrix is applied) to the remaining areas. This is applicable even to other embodiments.

Embodiment 1-3) $G_A=G_B=G_C$, $G_D$

In the present disclosure, the separate 4×4 secondary transform may be allocated only to a bottom-right 4×4 block in the top-left 8×8 and another 4×4 secondary transform may be identically applied to remaining 4×4 blocks.

Embodiment 1-4) $G_A$, $G_B=G_C$, $G_D$

In the present disclosure, an individual 4×4 secondary transform may be allocated to the top-left 4×4 block, and the bottom-right 4×4 block in the top-left 8×8 and the separate 4×4 secondary transform may be identically applied to two remaining 4×4 blocks B and C.

Since at least one transform to up to four transforms may be applied to four blocks of FIG. 17 above, more embodiments may be applied at the time of allocating the transform.

For example, the same transform may be applied to all cases as in Embodiment 1-2 or different transforms may be applied according to the intra prediction mode. As a specific example, in the transform set of FIG. 12 above, Embodiment 1-1) above may be applied to transform set #16 and Embodiment 1-3) above may be applied to transform set #30.

In order to reduce the number of transforms, some groups may be configured to use the same $G_A$, $G_B$, $G_C$, $G_D$. For example, when Embodiment 1-2) above is applied, if two adjacent prediction mode groups use the same transform set, a total of 110 (=2×2×2+17×3×2) 4×4 secondary transforms are required. For example, adjacent prediction modes are grouped like 0, 1, (2, 3), (4, 5), (6, 7), (8, 9), . . . , (32, 33), 34 to apply the same transform set. However, prediction modes 0, 1, and 34 may not be grouped.

FIG. 18 illustrates partitions for a maximum of 8×8 top-left divided areas to which a 4×4 secondary transform is applied as an embodiment to which the present disclosure is applied.

Embodiment 2: Sharing 4×4 Secondary Transform Between Blocks Having Various Sizes and Shapes When the area to which the secondary transform is applied is limited to a top-left area having up to 8×8 size and the secondary transform is applied in units of 4×4 block, partitions for the top-left area having up to 8×8 size may be expressed as (a), (b), (c), and (d) of FIG. 18 (4×4, 8×4, 4×8, and 8×8).

Referring to FIG. 18 above, when the 8×8 area is divided into four 4×4 areas of A, B, C, and D, labeling for the 4×4 blocks occupying the same location in areas having the 8×8 size is applied even to areas smaller than 8×8 as it is to express the areas as A, B, and C.

As an embodiment of the present disclosure, the same secondary transform may be applied to the 4×4 block which is at the same location regardless of the size and the shape of the block. For example, in FIG. 18 above, $G_A$ may be commonly applied to a block at location A, $G_B$ may be applied to B, $G_C$ may be applied to C, and $G_D$ may be applied to D. When such a configuration is applied, transform sets for a transform coefficient block having a size less than 8×8 and transform sets for a transform coefficient block having a size equal to or more than 8×8 may not separately be configured but be unified as one.

When different 4×4 secondary transforms are applied to areas A, B, C, and D and a transform set configuration of FIG. 12 above is applied, the number of 4×4 secondary transforms required for transform coefficient blocks having all sizes becomes 103×4=412.

However, as in Embodiment 1, if some blocks share the transform, the total transform number may be further reduced. For example, in the case of Embodiment 1-2) above, the total number of 4×4 secondary transforms becomes 103×2=206, and as a result, the number of required transforms is reduced to a half.

Embodiment 3: Conditional Application of Secondary Transform to Each of 4×4 Divided Blocks When the top-left area having up to 8×8 size is determined for one transform block and the configuration in Embodiment 1 is applied, the 4×4 secondary transform may be applied to each of all 4×4 divided blocks. As in Embodiment 1 above, the same 4×4 secondary transform may be applied or different 4×4 secondary transforms may be applied between the 4×4 blocks.

In an embodiment of the present disclosure, a transform to be applied may be determined by an NSST index (or may be referred to as transform index).

If the NSST index is not 0, corresponding 4×4 secondary transforms are applied to all of four 4×4 blocks in FIG. 17 above. On the contrary, if the NSST index is 0, no transform is applied to all 4×4 blocks.

Here, the corresponding 4×4 secondary transform may be configured to be applied only when a specific condition is satisfied for each 4×4 block. For example, when the number of non-zero coefficients in each 4×4 block is equal to or more than a specific threshold, the corresponding 4×4 secondary transform may be configured to be applied.

As described above, when whether to apply the transform is determined according to whether the condition is satisfied, the corresponding transform may be applied to any area and not applied to other areas according to whether the condition is satisfied for four areas (or (a) one area, (b) and (c) two areas, and (d) four areas in FIG. 18 above) in FIG. 17 above.

If the threshold is 2 and the number of non-zero transform coefficients is equal or less than 1 for each 4×4 block, the 4×4 secondary transform is not applied.

In order to use the conditional transform according to the threshold, a case should be excluded in which the number of non-zero transform coefficients is less than the threshold after the secondary transform is applied in the encoder.

Embodiment 4: Diversification of 4×4 Secondary Transform Type Applicable

In the above embodiments (Embodiments 1, 2, and 3), examples are described in which the top-left area having up to 8×8 size is divided into 4×4 blocks and the corresponding secondary transform is applied for each 4×4 block. Here, there is no assumption for what type of secondary transform is to be applied. Fundamentally, any type of secondary transform may also be allowed, and the transform may have a non-separable form or a separable form. Further, many types of known transforms (e.g., SOT, RST, LGT, and NSST) may also be applied.

If there is no constraint on the type of available second transform, different transforms may be applied in a variety of cases. Hereinafter, some of the available embodiments will be described.

Embodiment 4-1) In the present disclosure, a type of transform called P may be applied to the transform block having the 8×8 size or more and a type of transform called Q may be applied to the transform block having the size less than the 8×8 size.

Embodiment 4-2) In the present disclosure, the type of transform applied to area A of FIG. 17 above and the type of transform applied to the remaining areas B, C, and D may be differently configured. That is, the transform may be differently configured for each area. For example, it may be advantageous in terms of performance to apply a more complex and sophisticated transform because non-zero transform coefficients are more concentrated on the top-left 4×4 area A.

Embodiment 4-3) In the present disclosure, a different transform may be applied for each prediction mode group. For example, the type of transform called P may be applied to a planar mode and a DC mode and the type of transform called Q may be applied to the remaining directional mode.

Embodiment 4-4) In the present disclosure, a configuration of leaving only some of the transform coefficients such as RST may be applied even to the transform such as LGT or NSST. That is, L (L<N) transform coefficients which are some of N transform coefficients generated by applying LGT or NSST may be configured to be left. If the transform is called Reduced LGT (RLGT) when applying such a configuration to LGT and called Reduced NSST (RNSST) when applying such a configuration to NSST, normal SOT, normal LGT, or normal NSST may be configured to be applied to area A of FIG. 17 above and RST, RLGT, or RNSST may be configured to be applied to areas B, C, and D.

As mentioned in Embodiment 4-2) above, since more non-zero transform coefficients are concentrated on the top-left 4×4 area A, more transform coefficients (transform coefficients generated after applying the secondary transform) are left to minimize an error for a reconstructed signal after the inverse transform.

FIG. 19 is a diagram for describing a method for dividing an area to which a secondary transform is applied into M areas and allocating an index to each location as an embodiment to which the present disclosure is applied and FIGS. 20A and 20B are diagrams for describing a method for dividing, when dividing an area to which a secondary transform is applied, a transform to the divided area as an embodiment to which the present disclosure is applied.

Embodiment 5: Transform Configuration when Dividing Secondary Transform Application Area into Arbitrary Shape When a secondary transform application area constituted by all N locations is partitioned into M areas ($P_0, P_1, \ldots, P_{M-1}$) and each $P_i$ ($i=0, 1, \ldots, M-1$) is an index set for N locations, a secondary transform corresponding to each $P_i$ may be allocated and the secondary transform may be denoted by $G_{p_i}$. For example, as illustrated in FIG. 19, when indexes 0 to 63 are allocated to respective locations constituting the 8×8 area in a raster-scan order, each $P_i$ becomes a subset of the entire index set $\{0, 1, 2, \ldots, 62, 63\}$ and $P_i \cap P_j = \phi$ ($i, j=0, 1, \ldots, M-1, i \neq j$) is satisfied.

Further, when the size of $P_i$, that is, the number of internal elements is represented by $|P_i|$, $$\sum_{i=0}^{M-1} |P_i| = N$$

is satisfied.

Embodiments using the notation are as follows.

Embodiment 5-1) $|P_0|=32$, $|P_1|=32$

In FIG. 20A, $P_0$ and $P_1$ are represented by 0 and 1, respectively. A secondary transform having 32 input data may be applied to each of two areas. In this case, when the transform is not RST, RLGT, and RNSST, the number of output transform coefficients also becomes 32. Here, the input data may be a subset for the top-left 8×8 area of the transform coefficient block to which the primary transform is applied.

Embodiment 5-2) $|P_0|=32$, $|P_1|=16$, $|P_2|=16$

In FIG. 20B, $P_0$, $P_1$, and $P_2$ are represented by 0, 1, and 2, respectively. The secondary transform having 32 input data may be applied to $P_0$ and the secondary transform having 16 input data may be applied to $P_1$ and $P_2$. Here, the input data may be the subset for the top-left 8×8 area of the transform coefficient block to which the primary transform is applied.

As another embodiment, in respect to all available embodiments, a different transform combination may be applied for each partition. Further, the number of available partitions is large, so various configurations as many as the partitions are also possible.

The partition assumed in the above embodiments (Embodiments 1 to 4) is also one of the available partitions and a transform which is partially the same or different may be applied to the 4×4 divided blocks.

As another embodiment, the partition configurations such as Embodiments 5-1) and 5-2) above may be differently configured for each prediction mode or prediction mode group. Alternatively, the partition may be differently configured according to the size of the transform coefficient block. For example, in the case of 8×8 or more and less than 8×8, the partition may be differently configured. As a specific example, partition (FIG. 20A) of Embodiment 5-1) above may be applied to the size of 8×8 or more and the partition illustrated in FIG. 18 above may be applied to the size less than 8×8.

Figure 21:
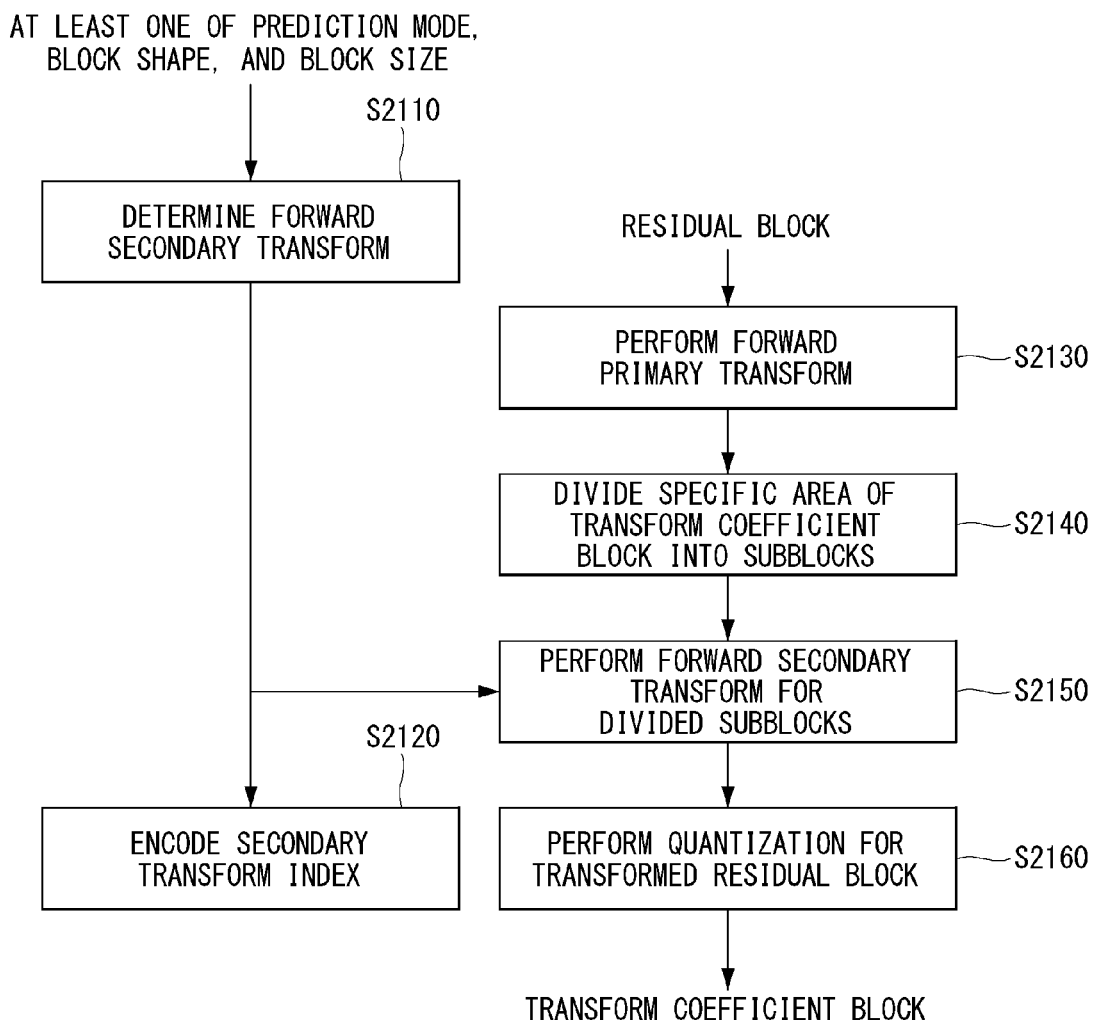
FIG. 21 is a flowchart of encoding a video signal by applying a secondary transform to a divided block as an embodiment to which the present disclosure is applied.

FIG. 21 is a flowchart of encoding a video signal by applying a secondary transform to a divided block as an embodiment to which the present disclosure is applied.

The encoder may determine (or select) the forward secondary transform based on at least one of the prediction mode, the block shape, and/or the block size of the current block (S2110). In this case, a candidate of the forward secondary transform may include at least one of the embodiments of FIG. 6 and/or FIG. 12 above.

The encoder may determine an optimal forward secondary transform through Rate Distortion optimization. The optimal forward secondary transform may correspond to one of a plurality of transform combinations and the plurality of transform combinations may be defined by a transform index. For example, for the RD optimization, results of performing all of the forward secondary transform, quantization, residual coding, etc., may be compared for respective candidates. In this case, an equation such as cost=rate+λ·distortion or cost=distortion+λ·rate may be used, but the present disclosure is not limited thereto.

The encoder may signal a secondary transform index corresponding to the optimal forward secondary transform (S2120). Here, the secondary transform index may adopt other embodiments described in the present disclosure.

For example, the secondary transform index may adopt the transform set configuration of FIG. 12 above. Since one transform set includes two or three transforms according to the intra prediction mode, one of a maximum of four transforms may be configured to be selected in addition to a case of not applying the secondary transform. When indexes of 0, 1, 2, and 3 are assigned to the four transforms, respectively, an applied transform may be designated by signaling the secondary transform index for each transform coefficient block. In this case, index 0 may be allocated to a case where the identity matrix, i.e., the secondary transform is not applied.

Meanwhile, the encoder may perform the forward primary transform for the current block (residual block) (S2130). Here, step S2110 and/or step S2120 may be similarly applied to the forward primary transform.

The encoder may divide a specific area of the transform coefficient block to which the forward primary transform is applied into subblocks (S2130). For example, when the transform coefficient block is N×N, the specific area may mean a top-left M×M area (M≤N).

The encoder may perform the forward secondary transform for the subblocks by using the optimal forward secondary transform (S2140). For example, the optimal forward secondary transform may correspond to the subblocks. That is, the optimal forward secondary transform may be individually applied for each subblock or the same optimal forward secondary transform may be applied to all subblocks.

As an embodiment, the subblock may be grouped based on at least one of the location, the size, or the prediction mode or the same optimal forward secondary transform may be applied to the grouped subblocks.

As an embodiment, the optimal forward secondary transform may be the reduced secondary transform. The reduced secondary transform represents a transform in which N residual data (N×1 residual vectors) are input and L (L<N) transform coefficient data (L×1 transform coefficient vectors) are output.

As an embodiment, the reduced secondary transform may be applied to a specific area of the transform coefficient block. For example, when the current block is N×N, the specific area may mean a top-left N/2×N/2 area. However, the present disclosure is not limited thereto and may be differently configured according to at least one of the prediction mode, the block shape, or the block size. For example, when the current block is N×N, the specific region may mean a top-left M×M region (M≤N).

Meanwhile, the encoder performs quantization for the current block to generate a transform coefficient block (S2150).

The encoder performs entropy encoding for the transform coefficient block to generate the bitstream.

Figure 22:
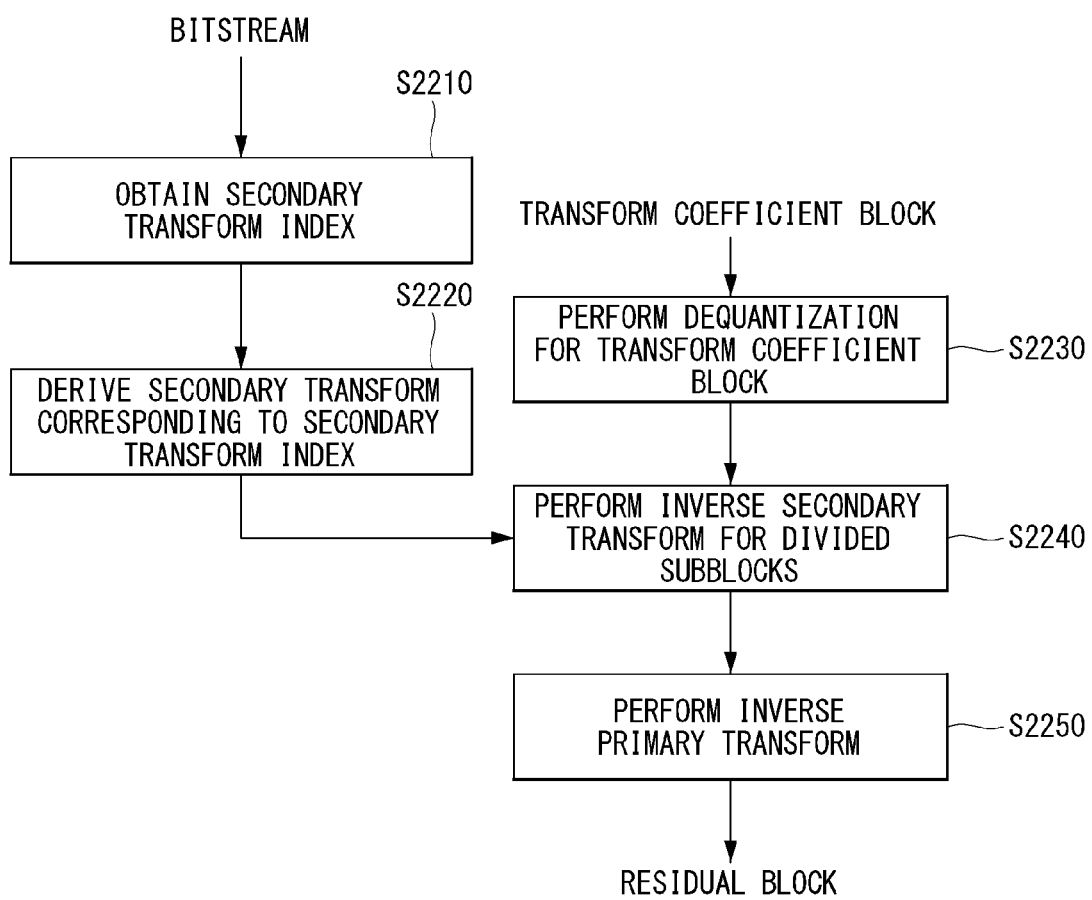
FIG. 22 is a flowchart of decoding a video signal by applying a secondary transform to a divided block as an embodiment to which the present disclosure is applied.

FIG. 22 is a flowchart of decoding a video signal by applying a secondary transform to a divided block as an embodiment to which the present disclosure is applied.

The decoder may obtain the secondary transform index from the bitstream (S2210). Here, the secondary transform index may adopt other embodiments described in the present disclosure. For example, the secondary transform index may include at least one of the embodiments of FIG. 6 and/or FIG. 12 above.

The decoder may derive the secondary transform corresponding to the secondary transform index (S2220). In this case, the candidate of the secondary transform may include at least one of the embodiments of FIG. 6 and/or FIG. 12 above.

As an embodiment, the secondary transform may correspond to the subblocks in the current block. That is, the secondary transform may be individually derived for each subblock or the same secondary transform may be derived to all subblocks.

However, steps S2210 and S2220 above are embodiments and the present disclosure is not limited thereto. For example, the decoder may not obtain the secondary transform index, but derive the secondary transform based on at least one of the prediction mode, the block shape, and/or the block size of the current block.

Meanwhile, the decoder may obtain the transform coefficient block by entropy-decoding the bitstream and perform dequantization for the transform coefficient block (S2230).

The decoder may perform the inverse secondary transform for the subblocks of the dequantized transform coefficient block (S2240). In this case, the inverse secondary transform may be individually applied for each subblock or the same inverse secondary transform may be applied to all subblocks.

As an embodiment, the inverse secondary transform may be the reduced secondary transform. The reduced secondary transform represents a transform in which N residual data (N×1 residual vectors) are input and L (L<N) transform coefficient data (L×1 transform coefficient vectors) are output.

As an embodiment, the reduced secondary transform may be applied to a specific area of the transform coefficient block. For example, when the transform coefficient block is N×N, the specific area may mean a top-left N/2×N/2 area. However, the present disclosure is not limited thereto and may be differently configured according to at least one of the prediction mode, the block shape, or the block size. For example, when the transform coefficient block is N×N, the specific region may mean a top-left M×M region (M≤N) or M×L (M≤N, L≤N).

In addition, the decoder may perform the inverse primary transform for the inverse secondary transform result (S2250).

The decoder generates the residual block through step S2250 and the residual block and the prediction block are added to generate a reconstruction block.

As another embodiment of the present disclosure, the decoder may obtain the transform coefficient block by performing entropy decoding and dequantization for the current block.

The decoder may derive a secondary transform corresponding to a specific area in the transform coefficient block. Here, the specific area represents an area including a top-left block of the transform coefficient block.

The decoder may perform an inverse secondary transform for each of the subblocks within the specific area using the secondary transform.

The decoder may perform the inverse primary transform for a block which the inverse secondary transform is applied to.

The decoder may reconstruct the current block using a block which the inverse primary transform is applied to.

As an embodiment, the specific area may be divided into 4×4 subblocks and the inverse secondary transform may be performed for each of the 4×4 subblocks.

As an embodiment, the same 4×4 secondary transform may be applied or different 4×4 secondary transforms may be applied to the 4×4 subblocks based on at least one of the locations or prediction modes of the subblocks.

As an embodiment, whether the specific area is divided into 4×4 subblocks may be determined based on a size of the transform coefficient block.

As an embodiment, in the present disclosure, it may be checked whether the number of non-zero transform coefficients within the 4×4 subblock is equal to or more than a specific threshold and it may be determined whether the 4×4 secondary transform is applied to the 4×4 subblock according to the checking result.

As an embodiment, when the number of non-zero transform coefficients within the 4×4 subblock is equal to or more than the specific threshold, the 4×4 secondary transform may be applied to the 4×4 subblock and otherwise, the 4×4 secondary transform may not be applied to the 4×4 subblock.

FIGS. 23 to 25 are embodiments to which the present disclosure is applied, and FIGS. 23 and 25 illustrate other examples of dividing an area to which a secondary transform is applied into M areas and allocating an index to each location and FIG. 24 is a diagram for describing a method for classifying areas based on grouping.

In an embodiment of the present disclosure, an arbitrary area to which the secondary transform is to be applied may be determined based on the sum of an X-direction coordinate and a Y-direction coordinate.

As illustrated in FIG. 23 above, when the 8×8 block is an input of the secondary transform, input data which is positioned on the same diagonal line is equal to the sum of the X-direction coordinate and the Y-direction coordinate. That is, when the coordinate of input data #1 is set to (0, 0), an X coordinate increases in a right direction and a Y coordinate increases in a downward direction. Here, a number shown in each location in the block is a serial number for location distinction other than an actual input data value.

Referring to FIG. 24 above, more specifically, it may be confirmed that the following groups may be formed. Here, a data set is distinguished based on the serial number shown in FIG. 23 above.

In an embodiment of the present disclosure, the area may be distinguished as follows based on grouping.

1) A few groups are collected to form the area. For example, groups 1, 2, 3, 4, 5, 6, 7, and 8 are collected as one area and the remaining groups 9, 10, 11, 12, 13, 14, and 15 are collected as the remaining area to form a total of two areas. When it is regarded that importance is higher as Group No. value is smaller in FIG. 24, if a total of N areas are formed, [1, 15] which is a total range of the Group No. value may be divided into N sections. For example, the section may be divided like $[1, G_1], [G_1+1, G_2], \ldots, [G_{N-1}+1, 15]$ ($1 \leq G_1 = G_2 < G_{N-1} < 15$).

2) The areas are not particularly collected only in units of the group, but a boundary between two areas in the group may occur. For example, when each of both areas is constituted by 32 locations, a first area may be configured to include locations groups 1, 2, 3, 4, 5, 6, and 7 and #29 to 32 in group 8 and a second area may be configured to include locations #33 to 36 in group 8 and groups 9, 10, 11, 12, 13, 14, and 15.

Here, when the area is divided into two or more areas, the boundary of the areas need not be a group unit and may be the location in the group. When the boundary of the area in the group occurs, area division may vary depending on a serial number configuration of locations. For example, number allocation of the locations may be a case illustrated in FIG. 25 above.

If two areas are divided into locations 1 to 32 and locations 33 to 64, the area division in FIG. 23 above and FIG. 25 above may be different.

FIG. 26 is a diagram for describing a method for dividing an area to which a secondary transform is applied into M areas based on a scan order as an embodiment to which the present disclosure is applied.

In the present disclosure, the areas may be divided according to the scan order. FIG. 26 above illustrates a case where the areas are divided according to the scan order for the 8×8 area.

For example, locations #1 to 48 may be applied to one area and locations #49 to 64 may be allocated to the other one area. As another example, locations #1 to 32 may be allocated to one area and locations #33 to 64 may be allocated to the other one area. More generally, when an entire area constituted by N locations is expressed as a section such as [1, N], the area may be divided into M areas like $[1, S_1], [S_1+1, S_2], \ldots, [S_{M-1}+1, N]$ ($1 \leq S_1 < S_2 < \ldots < S_{M-1} < N$).

In the above embodiments, a method and criteria for dividing the areas are described. The secondary transform need not be applied to all areas. For example, when the area is divided into two areas, the secondary transform may be applied to a more important secondary area including DC and the secondary transform may not be applied to the remaining area. As a specific example, when the 4×4 RST is applied, the 4×4 RST may be applied only to the top-left 4×4 area and the RST may not be applied (i.e., identity transform is applied) or a value of 0 may be allocated (i.e., zero matrix is applied) to the remaining areas.

As another example, when in respect to the 8×8 area, the areas are divided according to the scan order illustrated in FIG. 26, and #1 to 48 are allocated to one area and #49 to 64 are allocated to the other one area, the RST may be allocated to #1 to 48 and the RST may not be applied (i.e., identity transform is applied) and the value of 0 may be allocated (i.e., zero matrix is applied) to #49 to 64.

Figure 27:
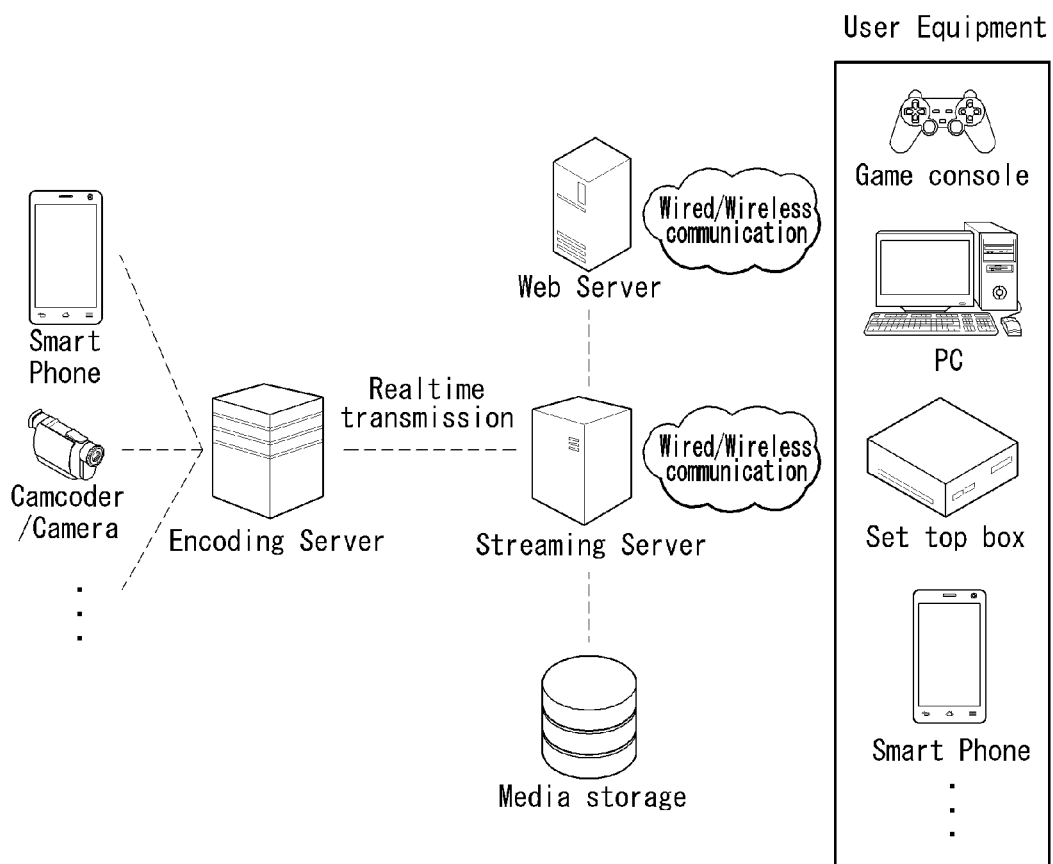
FIG. 27 is a structural diagram of a content streaming system as an embodiment to which the present disclosure is applied.

FIG. 27 illustrates a content streaming system to which the disclosure is applied.

Referring to FIG. 22, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for reconstructing a video signal, the method comprising:
    obtaining a transform block by performing an entropy decoding and a dequantization for a current block;
    deriving a secondary transform matrix corresponding to a specific area in the transform block, wherein the specific area represents an area including a top-left area of the transform block and wherein the secondary transform matrix is denoted based on an input length and an output length of a secondary transform;
    performing an inverse secondary transform for the specific area based on the secondary transform matrix;
    performing an inverse primary transform for a block which the inverse secondary transform is applied to; and
    reconstructing the current block based on a block which the primary inverse transform is applied to,
    wherein the input length of the inverse secondary transform is determined as 16, and the output length of the inverse secondary transform is determined as 48, based on that each of the height and the width of the transform block is equal to 8 or 16.

2. The method of claim 1, wherein the specific area is divided into 4×4 subblocks, and
    wherein the inverse secondary transform is performed for each of the 4×4 subblocks.

3. The method of claim 2, wherein the same 4×4 secondary transform is applied or different 4×4 secondary transforms are applied to the 4×4 subblocks based on at least one of locations or prediction modes of the subblocks.

4. The method of claim 2, wherein whether the specific area is divided into 4×4 subblocks is determined based on a size of the transform block.

5. The method of claim 2, further comprising
    checking whether the number of non-zero transform coefficients within in the 4×4 subblocks is equal to or more than a specific threshold, wherein whether the 4×4 secondary transform is applied to the 4×4 subblocks is determined according to the checking result.

6. The method of claim 5, wherein when the number of non-zero transform coefficients within the 4×4 subblocks is equal to or more than the specific threshold, the 4×4 secondary transform is applied to the 4×4 subblocks, and otherwise, the 4×4 secondary transform is not applied to the 4×4 subblocks.

7. An apparatus for reconstructing a video signal, the apparatus comprising:

a processor configured to perform an entropy decoding for a current block;

perform a dequantization for the current block to obtain a transform block;

derive a secondary transform matrix corresponding to a specific area in the transform block, wherein the specific area represents an area including a top-left area of the transform block and wherein the secondary transform matrix is denoted based on an input length and an output length of a secondary transform, perform an inverse secondary transform for the specific area based on the secondary transform matrix;

perform an inverse primary transform for a block which the inverse secondary transform is applied; and reconstruct the current block based on a block which the inverse primary transform is applied to, wherein the input length of the inverse secondary transform is determined as 16, and the output length of the inverse secondary transform is determined as 48, based on that each of the height and the width of the transform block is equal to 8 or 16.

8. The apparatus of claim 7, wherein the specific area is divided into 4×4 subblocks, and wherein the inverse secondary transform is performed for each of the 4×4 subblocks.

9. The apparatus of claim 8, wherein the same 4×4 secondary transform is applied or different 4×4 secondary transforms are applied to the 4×4 subblocks based on at least one of locations or prediction modes of the subblocks.

10. The apparatus of claim 8, wherein whether the specific area is divided into 4×4 subblocks is determined based on a size of the transform block.

11. The apparatus of claim 8, wherein the processor is further configured to:

check whether the number of non-zero transform coefficients within the 4×4 subblocks is equal to or more than a specific threshold and determines whether the 4×4 secondary transform is applied to the 4×4 subblocks according to the checking result.

12. The apparatus of claim 11, wherein when the number of non-zero transform coefficients within the 4×4 subblocks is equal to or more than the specific threshold, the 4×4 secondary transform is applied to the 4×4 subblocks, and otherwise, the 4×4 secondary transform is not applied to the 4×4 subblocks.

13. A non-transitory computer-readable medium storing a bitstream causing an image decoding apparatus to perform an image decoding method, the image decoding method comprising:

obtaining a transform block by performing an entropy decoding and a dequantization for a current block;

deriving a secondary transform matrix corresponding to a specific area in the transform block, wherein the specific area represents an area including a top-left area of the transform block and wherein the secondary transform matrix is denoted based on an input length and an output length of a secondary transform;

performing an inverse secondary transform for the specific area based on the secondary transform matrix;

performing an inverse primary transform for a block which the inverse secondary transform is applied to; and reconstructing the current block based on a block which the primary inverse transform is applied to, wherein the input length of the inverse secondary transform is determined as 16, and the output length of the inverse secondary transform is determined as 48, based on that each of the height and the width of the transform block is equal to 8 or 16.

* * * * *